US011557093B1

(12) United States Patent
Terrano

(10) Patent No.: US 11,557,093 B1
(45) Date of Patent: Jan. 17, 2023

(54) USING SOCIAL CONNECTIONS TO DEFINE GRAPHICAL REPRESENTATIONS OF USERS IN AN ARTIFICIAL REALITY SETTING

(71) Applicant: Meta Platforms Technologies, LLC, Menlo Park, CA (US)

(72) Inventor: Mark Terrano, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/566,335

(22) Filed: Sep. 10, 2019

(51) Int. Cl.
G06T 15/00 (2011.01)
G06T 19/00 (2011.01)
G06T 13/40 (2011.01)
H04L 67/10 (2022.01)
H04L 67/306 (2022.01)

(52) U.S. Cl.
CPC .............. *G06T 19/00* (2013.01); *G06T 13/40* (2013.01); *G06T 2210/08* (2013.01); *G06T 2210/36* (2013.01); *G06T 2219/024* (2013.01); *H04L 67/10* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 9,083,600 B1* | 7/2015 | Smith | ..................... | H04L 43/00 |
| 10,454,857 B1* | 10/2019 | Blackstock | .......... | G06Q 10/107 |
| 2008/0139316 A1* | 6/2008 | He | .......................... | G07F 17/32 |
| | | | | 463/42 |
| 2009/0080635 A1* | 3/2009 | Altberg | ............... | H04L 65/1069 |
| | | | | 379/216.01 |
| 2009/0177976 A1* | 7/2009 | Bokor | ..................... | G06F 3/011 |
| | | | | 715/753 |
| 2009/0183071 A1* | 7/2009 | Smith | ................. | G06F 3/04847 |
| | | | | 715/706 |
| 2009/0254859 A1* | 10/2009 | Arrasvuori | ............. | G06Q 10/10 |
| | | | | 715/810 |

(Continued)

OTHER PUBLICATIONS

Understanding Comics; "Realistic Vs. Abstract Art"; Downloaded Sep. 20, 2019 https://understandingcomics177.wordpress.com/about/ 1-2/2-2/3-2/.

(Continued)

*Primary Examiner* — Anh-Tuan V Nguyen
(74) *Attorney, Agent, or Firm* — Keller Preece PLLC

(57) ABSTRACT

Systems, methods, and non-transitory computer-readable media are disclosed for variably rendering graphical representations of co-users in VR environments based on social graph information between the co-users and a VR user. For example, the disclosed systems can identify a co-user within a VR environment. Furthermore, the disclosed systems can determine a social relevancy (e.g., a social relationship type) between the co-user and a VR user within the VR environment based on social graph information. Then, the disclosed systems can select and/or determine a graphical representation and/or other capabilities of the co-user within the VR environment based on the social relevancy. Additionally, the disclosed systems can display the co-user within the VR environment using the determined graphical representation type (e.g., from the perspective of the VR user).

20 Claims, 20 Drawing Sheets

(56) References Cited

U.S. PATENT DOCUMENTS

| | | | | |
|---|---|---|---|---|
| 2010/0115426 | A1* | 5/2010 | Liu | G06Q 10/107 |
| | | | | 715/757 |
| 2011/0183732 | A1* | 7/2011 | Block | G07F 17/32 |
| | | | | 463/1 |
| 2011/0296324 | A1* | 12/2011 | Goossens | G06Q 50/01 |
| | | | | 715/763 |
| 2012/0089698 | A1* | 4/2012 | Tseng | G06Q 10/107 |
| | | | | 709/217 |
| 2012/0110473 | A1* | 5/2012 | Tseng | H04M 1/72427 |
| | | | | 715/753 |
| 2012/0131478 | A1* | 5/2012 | Maor | G06Q 10/101 |
| | | | | 715/757 |
| 2012/0188277 | A1* | 7/2012 | Hebbar | A63F 13/52 |
| | | | | 345/629 |
| 2014/0282874 | A1* | 9/2014 | Bennette | H04L 63/102 |
| | | | | 726/3 |
| 2015/0295879 | A1* | 10/2015 | Jung | H04L 51/32 |
| | | | | 709/204 |
| 2016/0063277 | A1* | 3/2016 | Vu | G06F 21/6218 |
| | | | | 726/4 |
| 2016/0292284 | A1* | 10/2016 | Moxon | G06F 16/24578 |
| 2018/0027307 | A1* | 1/2018 | Ni | G06K 9/00315 |
| | | | | 345/419 |
| 2018/0059783 | A1* | 3/2018 | van Hoff | G06F 3/04815 |
| 2018/0060946 | A1* | 3/2018 | Devries | G06F 3/017 |
| 2018/0152403 | A1* | 5/2018 | Charignon | H04L 67/22 |
| 2018/0300916 | A1* | 10/2018 | Barnett | H04N 5/23293 |
| 2019/0102939 | A1* | 4/2019 | He | A63F 13/355 |
| 2019/0104235 | A1* | 4/2019 | Sarkar | H04N 21/472 |
| 2019/0335242 | A1* | 10/2019 | Miyazaki | G10L 15/26 |
| 2020/0195889 | A1* | 6/2020 | Sakai | H04N 7/152 |

OTHER PUBLICATIONS

Peter Rubin; "Fortnite's Marshmello Concert Is the Future of the Metaverse: The DJ set didn't need a headset, but it created a sense of presence that will prove integral as VR and AR become commonplace."; May 2, 2019; https://www.wired.com/story/fortnite-marshmello-concert-vr-ar-multiverse/.

"Brass Tactics"; Hidden Path Entertainment; Downloaded Oct. 28, 2019; http://www.hiddenpath.com/game/brass-tactics/.

"Facebook Spaces: VR is better with friends"; Downloaded Sep. 20, 2019; https://www.facebook.com/spaces.

Workplace by Facebook; "Connect everyone in your organization"; Downloaded Sep. 20, 2019; https://www.facebook.com/workplace.

Presentation: Second Life Wiki—Business Marketing; Downloaded Sep. 20, 2019; http://wiki.secondlife.com/wiki/Presentation.

Terence Huynh; "Microsoft launches Avatar Kinect, improves Xbox experience"; Jan. 6, 2011; http://techgeek.com.au/2011/01/06/microsoft-launches-avatar-kinect-improves-xbox-experience/.

Steam.com; All games > Casual Games > Comedy Night; "Comedy Night on Steam"; Downloaded Sep. 20, 2019 https://store.steampowered.com/app/665360/Comedy_Night/.

Wikipedia: The Free Encyclopedia; "1 vs. 100 (2009 video game)"; Downloaded Sep. 20, 2019; https://en.wikipedia.org/wiki/1_vs._100_(2009_video_game).

Rec Room; "Welcome to Rec Room, the virtual social club where you play and create games with friends"; Downloaded Sep. 20, 2019; https://recroom.com/rec-room.

Oculus.com; Apps & Games > "Oculus Venues"; Downloaded Sep. 20, 2019; https://www.oculus.com/experiences/go/1555304044520126/?locale=en_US.

* cited by examiner

| User Identity | Social Relationship Type | Information Type |
|---|---|---|
| | Type 2 | -Personal Information<br>-Mutual Friends<br>-Occupation |
| | Type 5 | -Name<br>-Relation |

USING SOCIAL CONNECTIONS TO DEFINE GRAPHICAL REPRESENTATIONS OF USERS IN AN ARTIFICIAL REALITY SETTING

BACKGROUND

The present disclosure generally relates to virtual reality (VR) systems. Virtual reality systems and environments allow a user to view a virtual environment through a head mounted display by generated sensory input. Sensory input can be any form of media, such as sound, video, graphics, etc. Often times, events (e.g., social events, video game events, sporting events, concerts, etc.) can be available in a virtual environment. Indeed, recent years have seen an increase in events that are available within virtual environments and are attended by a number of virtual reality system users. In particular, conventional virtual reality systems often enable large numbers of users to attend events within virtual reality environments and interact with and/or view other users and/or objects within the virtual reality environments.

However, conventional virtual reality systems often utilize an increasing amount of computational resources (e.g., processing power of a head mounted display) to display and/or manage a large number of users (e.g., hundreds, thousands, or millions of users) within a virtual reality environment. As such, many conventional virtual reality systems cannot efficiently and easily render large numbers of users within a virtual reality environment due to limitations in bandwidth and/or rendering power of virtual reality systems. For instance, many conventional virtual reality systems limit the number of users that are present in a virtual reality environment. Furthermore, conventional virtual reality systems often utilize an excessive amount of computational resources to include as many users in a virtual reality environment as possible (e.g., at the expense of battery life and/or excessive heat generation).

Additionally, conventional virtual reality systems often cannot efficiently and/or easily enable a user to interact with and/or manage a large number of users within a virtual reality environment. For example, some conventional virtual reality systems fail to enable a virtual reality user to easily discover and interact with other users (or graphical representations of users) that are relevant to the virtual reality user within a crowded virtual reality environment. Moreover, many conventional virtual reality systems also fail to efficiently and/or easily avoid unwanted behaviors and/or interactions between a virtual reality user and other users in the crowded virtual reality environment.

These along with other problems and issues exist with regard to conventional virtual reality systems.

SUMMARY

Embodiments of the present disclosure provide benefits and/or solve one or more of the foregoing or other problems in the art with systems, non-transitory computer-readable media, and methods for variably rendering graphical representations of co-users in VR environments based on social graph information associated with the co-users and a VR user. For instance, the disclosed systems can instantiate a social graph as a perceptible element (in correspondence to co-users) in a VR environment. In particular, the disclosed systems can determine the level of both spatial and physical representativeness (e.g., graphical representativeness) that a co-user has within a VR environment based on the amount of relevance the co-user occupies in a VR user's social graph. To illustrate, the disclosed systems can identify a co-user (e.g., a person having a virtual user identity that is present within the VR environment and viewed by a VR user), determine a social relevance between the co-user and the VR user based on social graph information, and display a graphical representation that is specific to the social relevance for the co-user (e.g., a social relevance type) to represent a virtual user identity associated with the co-user. For example, the disclosed systems can display a co-user that is a close friend as a realistic avatar and can also display another co-user that has no substantial social relevance to the VR user as a digital dot (e.g., a small particle) within the VR environment.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description is described with reference to the accompanying drawings in which:

FIGS. 11A-11C illustrate an example of a virtual reality system operating in an augmented reality scene in accordance with one or more embodiments.

DETAILED DESCRIPTION

Figure 1:
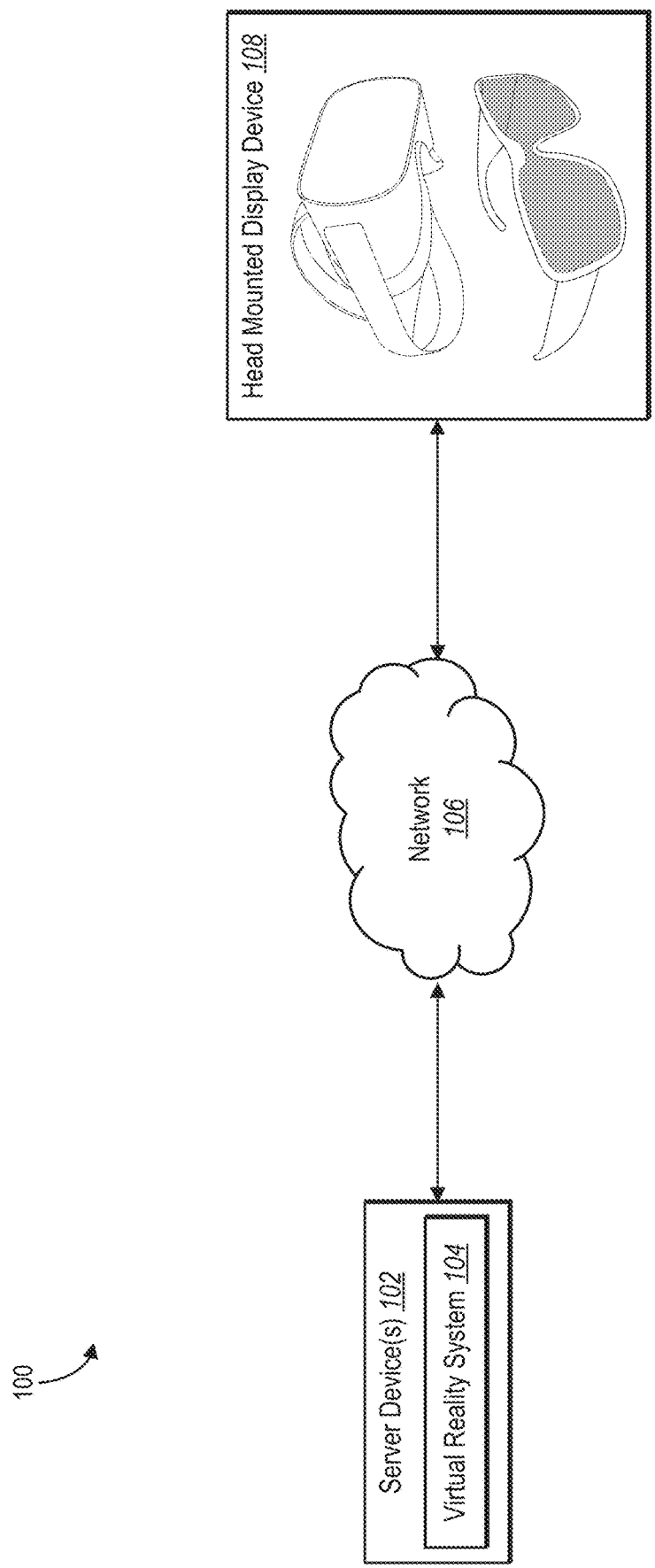
FIG. 1 illustrates a schematic diagram of an example environment in which a virtual reality system can operate in accordance with one or more embodiments.

One or more embodiments of the present disclosure includes a virtual reality system that variably renders a graphical representation of a co-user within a VR environment based on social graph information associated with the co-user and a VR user. In particular, the virtual reality system can identify a virtual user identity within a VR environment displayed within a head mounted display ("HMD") of a user. Additionally, the virtual reality system can determine a social relationship type for the co-user based on social graph information associated with the user and the co-user. Moreover, the virtual reality system can determine a graphical representation type for the co-user based on the social relationship type. Then, the virtual reality system can display the co-user within the VR environment using the graphical representation type (e.g., by causing the head mounted display to display the graphical representation type).

As mentioned above, the virtual reality system identifies a virtual user identify associated with a co-user within a VR environment and determines a social relationship type for the co-user based on social graph information associated with the co-user and a VR user (e.g., the VR user that is viewing the co-user). For instance, the virtual reality system can utilize connections associated with the co-user and the VR user on a social graph to determine a social relationship type between the co-user and the VR user. For example, the social relationship type can include a family member type, a close friend type, a casual friend type, an acquaintance type, a stranger type, or a restricted type. Furthermore, the virtual reality system can determine an affinity coefficient (or score) from connections associated with the co-user and the VR user on the social graph and utilize the affinity coefficient as the social relationship type.

Furthermore, the virtual reality system determines a graphical representation type for the co-user based on social graph information associated with the VR user and the co-user. For example, the virtual reality system can select a graphical representation type that corresponds to the social relationship type determined between the co-user and the VR user (e.g., based on a reference table of social relationship types and graphical representation types and/or user configured preferences). Indeed, in one or more embodiments, the virtual reality system selects a graphical representation type corresponding to a greater amount of graphical detail for the co-user in the VR environment based on determining a high social relevance between the co-user and the VR user from the social graph information (e.g., based on the determined social relationship type). Moreover, the virtual reality system can also determine a communication capability and/or other properties/capabilities for the co-user within the VR environment based on the determined social relationship type.

Then, the virtual reality system displays the determined graphical representation type (via the head mounted display) to represent the virtual user identity associated with the co-user within the VR environment. For instance, the virtual reality system can utilize the determined graphical representation type to portray the co-user within the VR environment with graphical details that correspond to the graphical representation type. Indeed, the virtual reality system can display the co-user within the VR environment as, but not limited to, a high-resolution avatar, a standard avatar, an indistinct avatar, and/or a digital dot based on the determined graphical representation type. For instance, the virtual reality system can display multiple co-users in the VR environment with different corresponding graphical representation types. As an example, the virtual reality system can display some co-users that are more socially relevant to the VR user as high-resolution avatars, can display some co-users that are less socially relevant as standard avatars, and can display some co-users that are insignificant on a social graph of the VR user as dots in the VR environment.

The virtual reality system provides many advantages and benefits over conventional systems. For instance, the virtual reality system can efficiently utilize computational resources to render a large number of users within a single VR environment. As an example, by variably rendering graphical representations of co-users based on social graph information associated with the co-users and a VR user, the virtual reality system can render VR environments having a large number of users (e.g., hundreds, thousands, or millions of users) while utilizing less computational resources compared to some conventional systems. Indeed, the virtual reality system can efficiently utilize computational resources by utilizing less bandwidth and rendering power by displaying co-users having a low social relevance with less graphical detail (e.g., as a dot) while conserving bandwidth and rendering power to display co-users having a greater social relevance with more graphical detail (e.g., as a high-resolution avatar).

Furthermore, the virtual reality system can improve the efficiency and ease at which a user interacts with and/or manages a large number of users that are present within a VR environment. For example, by variably rendering graphical representations of co-users based on social graph information associated with the co-users and a VR user, the virtual reality system can display co-users that are more relevant to a VR user such that those co-users are easier to discover and interact with in a crowded VR environment. Additionally, the virtual reality system enables a user avoid unwanted behavior from co-users, avoid unwanted interactions with co-users, and mitigate capacity limitations of venues displayed within a crowded VR environment with less complex controls (e.g., by automatically and/or variably rendering graphical representations of co-users based on social graph information and providing interfaces to configure such spatial and physical properties in the VR environment). Indeed, the virtual reality system can maximize positive relationships, mitigate limitations imposed by physically modeled venues, and reduce the impact of undesirable relationships on an overall VR experience by variably rendering graphical representations of co-users based on social graph information.

As illustrated by the foregoing discussion, the present disclosure utilizes a variety of terms to describe features and advantages of the virtual reality system. Additional detail is now provided regarding the meaning of such terms. For example, as used herein, the term "head mounted display" (sometimes referred to as a "HMD") refers to a wearable device capable of displaying digital content. In particular, the term "head mounted display" refers to a wearable device, that is positioned on a user's head, capable of displaying (or presenting) digital content such as graphics, images, video, sound, etc. For instance, a head mounted display can include a virtual reality headset, mixed reality headset, and/or augmented reality glasses.

As used herein, the term "virtual reality environment" (sometimes referred to as "virtual reality space" or "VR environment") refers to a three-dimensional representation of an environment (e.g., a replicated, recorded, and/or live streamed environment from the real world and/or a fabricated environment). In particular, the term "virtual reality environment" refers to a three-dimensional representation of an environment that a virtual reality user can perceive via sensory input generated by an HMD. A virtual reality environment can include a three-dimensional representation of a real-world event and/or location that is recorded and/or live streamed (e.g., a concert, a sporting event, a social gathering, a museum, a building, a sightseeing location). Furthermore, a virtual reality environment can also include a three-dimensional representation of a computer graphics-based environment (e.g., a graphics-based concert, a graphics-based social gathering, a video game, a graphics-based activity). Moreover, a virtual reality environment can enable a VR user to interact and/or communicate with co-users in the VR environment (and/or with elements of the three-dimensional representation).

As used herein, the term "co-user" refers to a participant within a VR environment that is perceived by a user that is experiencing the VR environment. In particular, the term "co-user" refers to an additional user that joins and/or is present within a VR environment (e.g., using a separate HMD) as a three-dimensional representation and/or is perceived within the VR environment from the point of view of a VR user that is experiencing the VR environment. For example, a co-user can include a person that a VR user perceives within a VR environment (e.g., a person that is also participating in the VR environment via a separate HMD). Furthermore, as used herein, the term "virtual user identity" refers to information that indicates and/or identifies a user within a VR environment. In particular, the term "virtual user identity" refers to data and/or information that enables the virtual reality system to identify a specific user (e.g., a co-user) within a VR environment.

As used herein, the term "social graph information" (sometimes referred to as a "social graph") refers to information from a collection of multiple nodes and/or edges that include information corresponding to users and/or concepts present on a social networking system. In particular, social graph information can include information from a social graph as described in FIG. 3 and FIG. 16 below. Furthermore, as used herein, the term "social connection" refers a link between one or more representative nodes and/or edges of a social graph. In particular, the term "social connection" refers to a representation of a relationship between any combination of two or more persons (or users), entities, objects, and/or concepts based on a link between one or more representative nodes and/or edges of the persons, entities, objects, and/or concepts on a social graph. A social connection can include a connection as described in greater detail in FIG. 3 and FIG. 16 below.

As used herein, the term "social relationship type" refers to a representative category of a relationship between two or more users. In particular, the term "social relationship type" refers to a category and/or label that defines a connection between two or more users using social graph information associated with the two or more users. For example, a social relationship type can include a category and/or label between two or more users such as, but not limited to, a family member type, a close friend type, a casual friend type, an acquaintance type, a stranger type, and/or a restricted type based on varying amounts of connections and/or relevancies present between the two or more users on a social graph. As an example, the virtual reality system can determine a social relationship type between two or more users as a close friend type based on the presence of a substantial number of connections between the two or more users on a social graph.

As used herein, the term "graphical representation type" refers to a representative category that includes a set of graphics-based spatial, physical, and/or visual properties. In particular, the term "graphical representation type" refers to a category and/or label that corresponds to a set of graphics-based spatial, physical, and/or visual properties a virtual reality system utilizes to display a user within a VR environment. For example, graphical representation types can include settings to present, render, and/or display users (or other objects) at different levels of graphical detail within a VR environment. Moreover, as used herein, the term "graphical detail" refers to the amount of resources and/or features used to render a graphics based object (e.g., a three-dimensional representation of a user within a VR environment). For instance, graphical detail can include, but is not limited to, varying amounts of geometrical features, color features, shader elements, physics features present in and/or processed for a three-dimensional representation of a user and/or object within a VR environment.

Moreover, a graphical representation type can include selections of representations (for a user) in the form of, but not limited to, an avatar and/or a dot. As used herein, the term "avatar" (sometimes referred to as a "digital avatar") refers to a visually human-like (e.g., anthropomorphic), three-dimensional representation of a user within a VR space. As an example, an avatar can further be represented at varying levels of graphical details using graphical representation types such as, but not limited to, a high-resolution avatar, a standard avatar, and/or an indistinct avatar. As used herein, the term "high-resolution avatar" refers to a three-dimensional representation of a user that provides a realistic (e.g., accurate, life-like, and/or photorealistic) portrayal of the user within the VR environment. Additionally, as used herein, the term "standard avatar" refers to a three-dimensional representation of a user that provides a simplified (e.g., animated, caricature-like, cartoon-like) portrayal of the user within the VR environment. Furthermore, as used herein, the term "indistinct avatar" refers to a three-dimensional representation of a user that provides a basic portrayal of a user (e.g., using a basic figure, shape, and/or characteristic of a person) that is semi-transparent within the VR environment. Additionally, as used herein, the term "dot" (sometimes referred to as a "particle" or a "mote") refers to a visual point of light or a floating spot that is displayed to portray a user within the VR environment. For example, a dot can include a visual floating point of light that represents a position and/or presence of a user within the VR environment.

As used herein, the term "communication capability" refers to an ability of a user within a VR environment to communicate with other users. In particular, the term "communication capability" refers an ability of a user to use various methods of communicating within a VR environment via, but not limited to, voice (e.g., a voice-based communication capability), text (e.g., a text-based communication capability), movement (e.g., a movement-based communication capability), emotes (e.g., an emote-based communication capability), color (e.g., a color-based communication capability), symbols (e.g., a symbol-based communication capability), and/or sound effects (e.g., a sound effect-based communication capability). For instance, the communication capability of a co-user within a VR can be determined based on social graph information associated with the co-user and a VR user (e.g., providing a communication capability of voice to a co-user determined to be a family member-type and/or a significant number of connections on a social graph).

Turning now to the figures, FIG. 1 illustrates a schematic diagram of an environment 100 in which a virtual reality system 104 can operate. As illustrated in FIG. 1, the environment 100 can include server device(s) 102, a network 106, and a head mounted display device 108. As further illustrated in FIG. 1, the server device(s) 102 and the head mounted display device 108 can communicate via the network 106. Furthermore, although FIG. 1 illustrates the virtual reality system 104 implemented on the server device(s), the virtual reality system 104 can be implemented and can operate on the head mounted display device 108 (and/or any other component of the environment 100).

As shown in FIG. 1, the server device(s) 102 can include the virtual reality system 104. The virtual reality system 104 can generate and/or obtain data for the head mounted display device 108 (via the server device(s) 102). Furthermore, the virtual reality system 104 can provide and/or generate virtual reality elements (e.g., graphics, audio, video, other sensory input) related to an event (e.g., concerts, video games, social meetups) for the head mounted display device 108 (via the server device(s) 102). Additionally, the virtual reality system 104 can manage user actions of one or more users within a virtual reality environment by receiving information (e.g., interactions, movements, communications) from one or more head mounted display devices operated by the one or more users (e.g., the head mounted display device 108) via the server device(s) 102.

Additionally, the server device(s) 102 can include one or more social graphs corresponding to a social networking system. Moreover, the virtual reality system 104 can identify users present within a virtual reality environment, determine social relationship types between the users, and also determine graphical representation types for the users based on the one or more social graphs (via the server device(s) 102). Indeed, the virtual reality system 104 (from the server device(s) 102) can also provide the graphical representation types to the head mounted display device 108. The server device(s) 102 can include a variety of computing devices, including those explained below with reference to FIG. 14.

Moreover, as shown in FIG. 1, the virtual reality system 104 includes the head mounted display device 108 (e.g., a VR headset and/or AR glasses). The head mounted display device 108 can receive virtual reality elements, user data for one or more co-users (e.g., communications, interactions, movements), social relationship type data of co-users, and/or graphical representation type data for the co-users in a VR environment. Indeed, the head mounted display device 108 can utilize such data to render and/or display the VR environment and the virtual representation of co-users (using their corresponding graphical representation types) within the VR environment for a VR user wearing the head mounted display device 108. Furthermore, the head mounted display device 108 can capture tracking and/or other information of the VR user (e.g., motion tracking, eye tracking, interaction information, communication information, graphical representation preferences, communication capability preferences, etc.) and provide such information to the server device(s) 102 (e.g., to the virtual reality system 104).

In one or more embodiments, the head mounted display device 108 can include an electronic display to display VR elements. Indeed, the head mounted display device 108 can generate an immersive VR environment in which a VR user perceives co-users present in the VR environment, objects in the VR environment physically and/or spatially. Moreover, the head mounted display device 108 can include other components to enable a VR user to receive and/or send communications to co-users in the VR environment (e.g., voice chat). Additionally, although FIG. 1 and one or more embodiments herein disclose the head mounted display device 108 displaying and/or rendering a VR environment and co-users within the VR environment, the virtual reality system 104 can provide information and/or utilize information on a mobile processing device to render graphics and/or other elements for the VR environment and cause the head mounted display device 108 to display such graphics thereafter.

Furthermore, as shown in FIG. 1, the environment 100 includes the network 106. The network 106 can enable communication between components of the environment 100. In one or more embodiments, the network 106 may include the Internet or World Wide Web. Additionally, the network 106 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the head mounted display device 108, and the network 106 may communicate using any communication platforms and technologies suitable for transporting data and/or communication signals, including any known communication technologies, devices, media, and protocols supportive of data communications. Although FIG. 1 illustrates the server device(s) 102 and the head mounted display device 108 communicating via the network 106, the various components of the environment 100 can communicate and/or interact via other methods (e.g., the server device(s) 102 and the head mounted display device 108 can communicate directly).

Furthermore, as previously mentioned, the virtual reality system 104 can be implemented by any particular component and/or device within the environment 100. For instance, the virtual reality system 104 can be implemented, in whole or in part, by the server device(s) 102, the head mounted display device 108, and/or a mobile processing device (as described below). Moreover, the description herein can refer to the virtual reality system 104 performing all of the steps for one or more embodiments disclosed herein. Indeed, the one or more embodiments disclosed herein can be performed by the virtual reality system 104 with any described component and/or in any arrangement.

Although not shown in FIG. 1, the virtual reality system 104 can be implemented on a mobile processing device (e.g., a staging device) associated with the head mounted display device 108. For example, the mobile processing device can include, but is not limited to, a mobile graphics processing device, a mobile device (e.g., smartphone or tablet), a laptop, a desktop, including those explained below with reference to FIG. 14. In particular, the mobile processing device can include a device operated in connection with the head mounted display device 108. For instance, the mobile processing device can determine social relationship types and/or graphical representation types in accordance with one or more embodiments herein. Moreover, the mobile processing device can provide and/or instruct the head mounted display device 108 to display the graphical representation types within a VR environment to portray one or more co-users.

Figure 2:
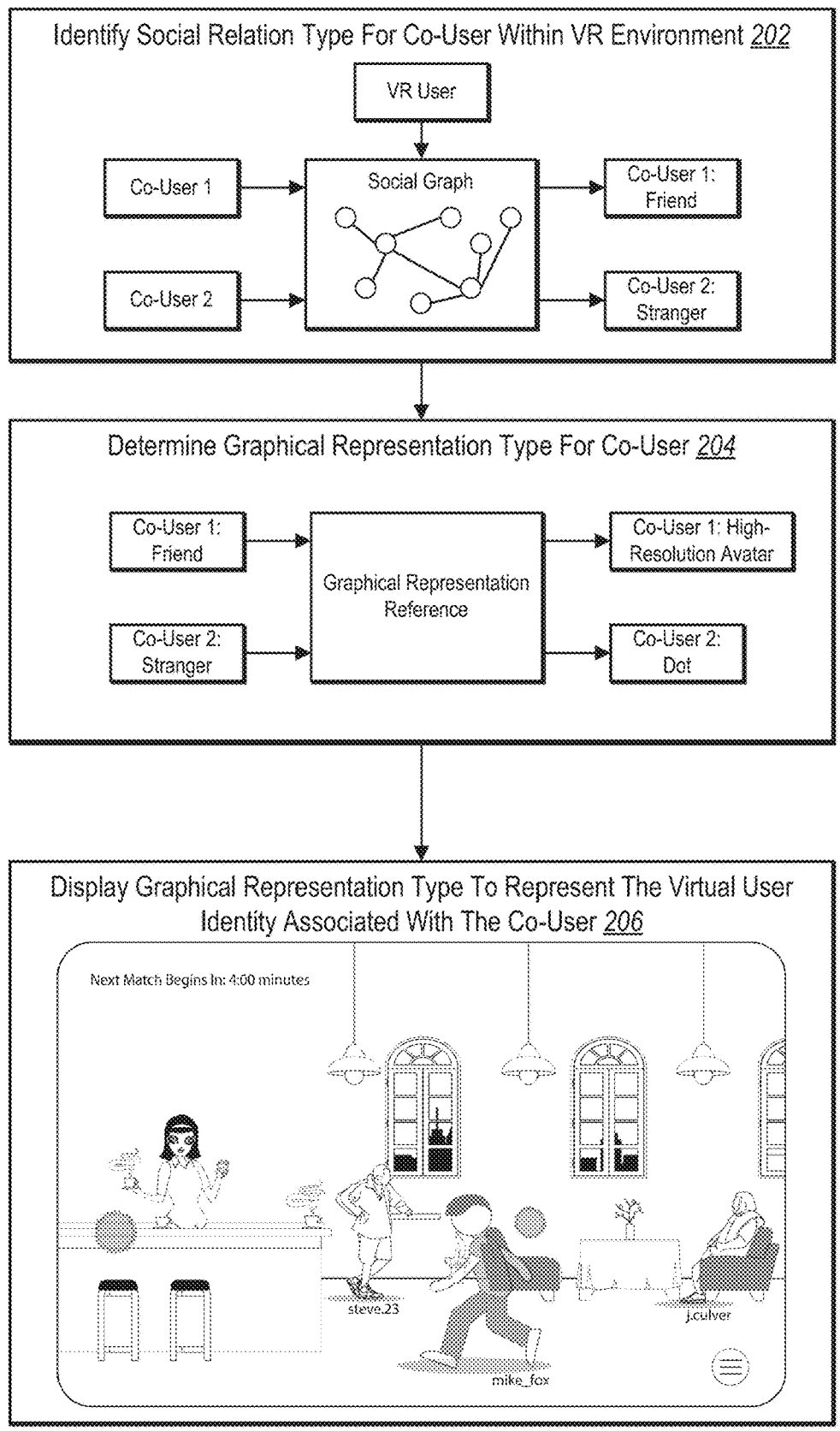
FIG. 2 illustrates an overview of a virtual reality system variably rendering a graphical representation of a co-user within a VR environment based on social graph information in accordance with one or more embodiments.

As mentioned above, the virtual reality system 104 can variably render a graphical representation of a co-user within a VR environment based on social graph information associated with the co-user and a VR user. For instance, FIG. 2 illustrates an overview of a sequence of acts that the virtual reality system 104 performs in relation to identifying social relevancies between users of a VR environment, determining graphical representations for those users based on the social relevancies, and displaying the users within the VR environment using the determined graphical representations. As previously mentioned, the acts performed by the virtual reality system 104 can be implemented by a variety of components (e.g., the server device(s) 102 and/or the head mounted display device 108).

For example, as shown in FIG. 2, the virtual reality system 104 performs an act 202 of identifying a social relationship type for a co-user within a VR environment. In particular, the virtual reality system 104 can identify one or more co-users that are present within (and/or are joining) a VR environment using virtual user identities. Then, the virtual reality system 104 can utilize one or more social graphs to identify social connections between the one or more co-users and a VR user (e.g., the VR user that perceives the co-users within the VR environment). Indeed, the virtual reality system 104 can utilize the identified social connections to assign (or determine) social relationship types for the one or more co-users (e.g., as shown in FIG. 2, co-user 1 is determined to be a "friend" and co-user 2 is determined to be a "stranger"). Additional detail regarding the virtual reality system 104 identifying a social relationship type (or a social relevance) for a co-user within a VR environment is provided in greater detail in FIGS. 3 and 11A.

Additionally, as illustrated in FIG. 2, the virtual reality system 104 performs an act 204 of determining a graphical representation types for a co-user. In particular, the virtual reality system 104 can select a graphical representation type that corresponds to a social relationship type determined for a co-user (e.g., from a graphical representation type reference that is predetermined and/or created from received preferences from a VR user by the virtual reality system 104). In some embodiments, the virtual reality system 104 determines a graphical representation type from a sliding scale that increases the level of graphical detail (of the graphical representation for a co-user) based on the amount of social relevancy between the co-user and the VR user. As an example, as shown in FIG. 2, the virtual reality system 104 can determine a graphical representation type of a high-resolution avatar for the co-user 1 (e.g., the co-user 1 having a social relationship type of "friend") and a graphical representation type of a digital dot for the co-user 2 (e.g., the co-user 2 having a social relationship type of "stranger").

Moreover, the virtual reality system 104 can also determine communication capabilities for the co-user within the VR environment based on the social graph information associated with the co-user and the VR user. Furthermore, the virtual reality system 104 can also determine other capabilities (or properties) such as interactive capabilities and/or positional properties of the co-user within the VR environment based on the social graph information. Additional detail regarding the virtual reality system 104 determining a graphical representation type and/or other capabilities (or properties) of a co-user within a VR environment based on social graph information is provided in FIGS. 4, 5, 7, 9, and 11B.

Additionally, as illustrated in FIG. 2, the virtual reality system 104 performs an act 206 of displaying a graphical representation type to represent a virtual user identity associated with a co-user (e.g., displaying a co-user within a VR environment using the graphical representation type). Indeed, the virtual reality system 104 can display multiple co-users within the VR environment by displaying individually determined graphical representation types for each of the co-users. As an example, as illustrated in FIG. 2, the virtual reality system 104 can render (and display) co-users within a VR environment as dots, indistinct avatars, standard avatars, and high-resolution avatars based on the determined graphical representation types for the co-users. Additionally, the virtual reality system 104 can enable communication, enable interactions, and/or position co-users with respect to the VR user within the VR environment in accordance to capabilities and/or properties determined based on the social graph information for those co-users. Additional detail regarding the virtual reality system 104 rendering (and/or displaying) co-users within a VR environment using determined graphical representations and/or determined capabilities based on social graph information is provided in FIGS. 6, 8, 10A-10D, and 11C.

Figure 3:
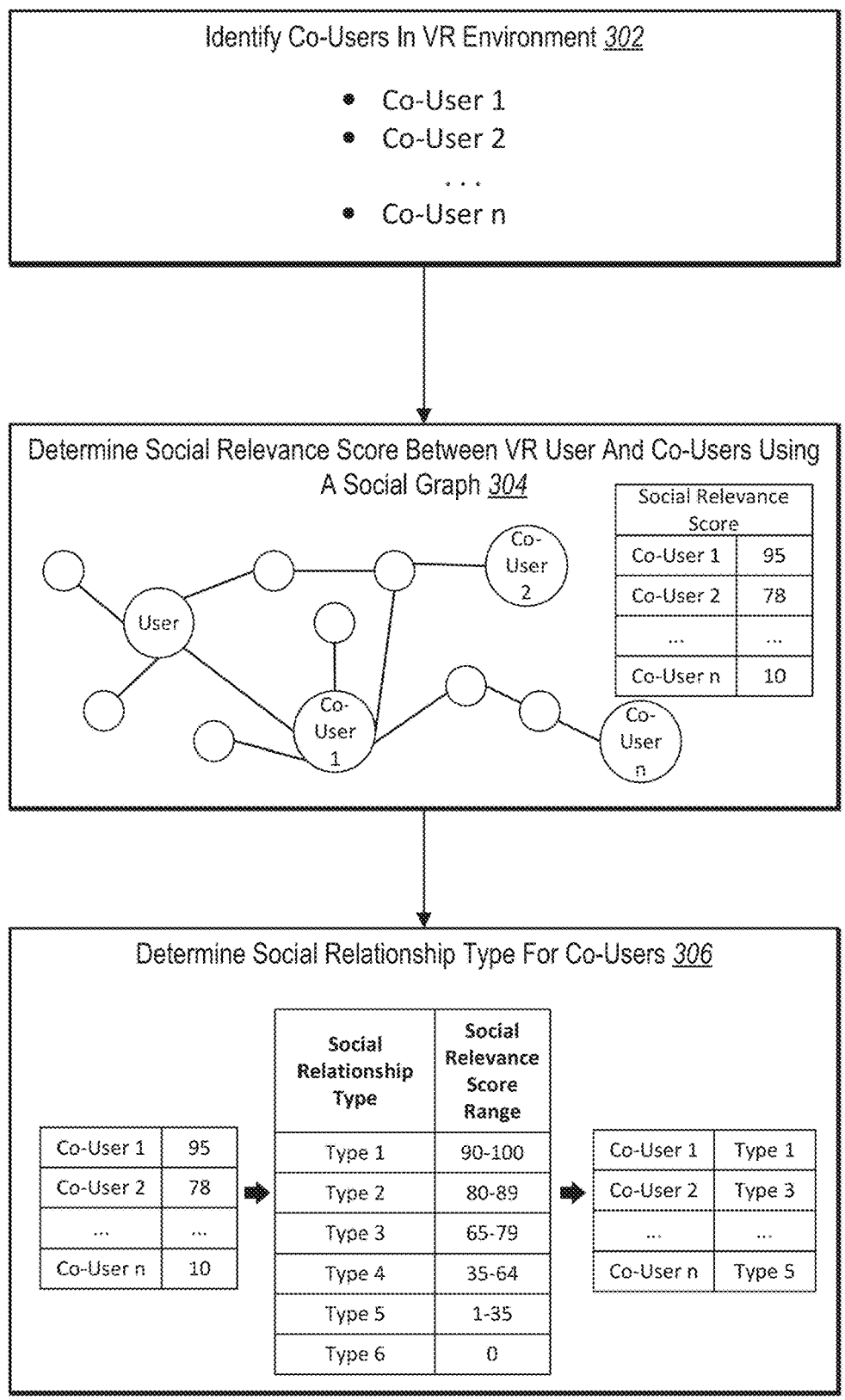
FIG. 3 illustrates a virtual reality system determining a social relevancy between for a co-user within a VR environment based on social graph information in accordance with one or more embodiments.

As mentioned above, the virtual reality system 104 can determine social relevancies between one or more co-users and a VR user within a VR environment. For example, FIG. 3 illustrates the virtual reality system 104 identifying one or more co-users within a VR environment and utilizing social graph information to determine social relevancies associated with the one or more co-users and the VR user (e.g., social relevancies between the users). As shown in FIG. 3, the virtual reality system 104 identifies co-users within a VR environment (e.g., co-user 1, co-user 2, . . . , and co-user n) in an act 302 (e.g., by identifying virtual user identities associated with the co-users). Then, as illustrated in FIG. 3, the virtual reality system 104 determines a social relevance score between the VR user and the one or more co-users using a social graph in an act 304 (e.g., one or more social graphs corresponding with the VR user and the one or more co-users). Moreover, as shown in FIG. 3, the virtual reality system 104 utilizes the social relevance scores determined for the co-users (in the act 304) to determine social relationship types for the one or more co-users in an act 306.

Indeed, as shown in FIG. 3 (in the act 306), the virtual reality system 104 uses social relationship types corresponding to a range of social relevance scores to assign a social relationship type to the co-users. For example, as illustrated in FIG. 3, the virtual reality system 104 assigns a social relationship type of "type 1" to co-user 1 because co-user 1 has a social relevance score of 95 (e.g., between the social relevance score range of 90-100) in the act 306. Furthermore, as shown in FIG. 3, the virtual reality system 104 assigns a social relationship type of "type 3" to co-user 2 (e.g., based on a social relevance score of 78) and assigns a social relationship type of "type 5" to co-user n (e.g., based on a social relevance score of 10) in the act 306.

As an example, the virtual reality system 104 can define the social relationship types to indicate an increase in social relevancy and/or a decrease in social relevancy (e.g., referring to FIG. 3, a type 1 social relationship type can indicate a higher social relevancy between a co-user and VR user compared to a type 2 and so forth). Furthermore, referring to FIG. 3, the virtual reality system 104 can utilize the social relationship types to indicate any variety of social relationships between a co-user and a VR user. In some embodiments, the virtual reality system 104 utilizes the social relationship type of "type 1" to indicate a family member type, "type 2" to indicate a close friend type, "type 3" to indicate a casual friend type, "type 4" to indicate an acquaintance type, "type 5" to indicate a stranger type, and "type 6" to indicate a restricted type.

As previously mentioned, the virtual reality system 104 can identify one or more co-users within a VR environment. For instance, the virtual reality system 104 can determine one or more virtual user identities corresponding to the one or more co-users present within the VR environment (e.g., based on server data and/or data corresponding to the VR session). Indeed, the virtual reality system 104 can identify a virtual user identity associated with a co-user as the co-user joins the VR environment (e.g., logging in, joining, etc.). In some embodiments, the virtual reality system 104 determines virtual user identities for the co-users that are present within the VR environment while initializing the VR environment for the VR user (e.g., while the VR user joins a VR environment). The virtual reality system 104 can utilize such approaches to identify any number of co-users present in a VR environment (e.g., all co-users participating in a VR environment for a concert event).

Moreover, the virtual reality system 104 can utilize identified co-users (and/or virtual user identities of the co-users) to determine social relevancies between the co-users and the VR user. Indeed, the virtual reality system 104 can determine social relevancy (and/or a social relationship type) between the co-user (present within the VR environment) and the VR user by accessing information on one or more social graphs associated with the co-user and the VR user. In particular, the virtual reality system 104 can utilize one or more social graphs (or social graph information) to determine any of and/or any combination of a number of connections, a number of interactions, an affinity, and/or a social relevancy score associated with the co-user and the VR user.

In particular, the virtual reality system 104 can utilize a social graph that includes one or more nodes and/or edges corresponding to a social networking system. For instance, the virtual reality system 104 can access nodes that correspond to user identities (e.g., virtual user identities) and/or concepts and one or more edges that connect the nodes (e.g., a connection between two or more users, a user and a concept, a concept and two or more users, etc.). As an example, the social graph can update one or more nodes and/or edges upon receiving interactions and/or updates from a user (e.g., create and/or modify connections between the user's node and other nodes on the social graph). Indeed, the virtual reality system 104 can utilize the social graph to determine a number of connections, a number of interactions, an affinity, and/or other social relevance scores based on the nodes and/or edges within the social graph. One or more embodiments and/or features of a social graph are described in greater detail are described in greater detail in FIG. 16.

For example, the virtual reality system 104 can utilize social graph information to identify one or more social connections associated with a co-user and a VR user. In particular, the virtual reality system 104 can identify one or more edges (of a social graph) that connect a VR user's node and a co-user's node in the social graph as a social connection (e.g., both VR user and co-user indicate each other as friends, family, and/or some other relationship). Additionally, the virtual reality system 104 can also identify one or more nodes (e.g., a concept and/or other user) that share one or more edges with both the VR user's node and the co-user's node in the social graph as a social connection (e.g., a mutual friend, mutual likes/dislikes, mutual preferences, etc.). Indeed, the virtual reality system 104 can identify any number of social connections between the VR user and the co-user from social graph information.

Furthermore, the virtual reality system 104 can also utilize social graph information to identify one or more interactions between a co-user and a VR user. For example, the virtual reality system 104 can identify interactions such as, but not limited to, messages sent, newsfeed posts, and/or profile visits between the VR user and co-user. In particular, the virtual reality system 104 can identify any number of interactions between the VR user and the co-user from social graph information.

Additionally, the virtual reality system 104 can provide weights to different types of social connections and/or interactions between a co-user and a VR user. For instance, the virtual reality system 104 can provide more weight (e.g., provide more importance and/or value in a social relevancy score) to an edge that directly connects the VR user's node and the co-user's node compared to an edge that indirectly connects the two nodes (e.g., the two nodes connect via an intermediary node on the social graph). As an example, the virtual reality system 104 can provide more weight to a social connection that identifies the VR user and co-user as friends on the social graph compared to a social connection that identifies that the VR user and the co-user are both interested in the same type of music. Moreover, the virtual reality system 104 can provide more weight to interactions that are considered more direct between the VR user and the co-user. For instance, the virtual reality system 104 can provide more weight to an interaction that indicates a private message between the VR user and the co-user compared to an interaction on a comment on content corresponding to a concept node on the social graph.

Figure 16:
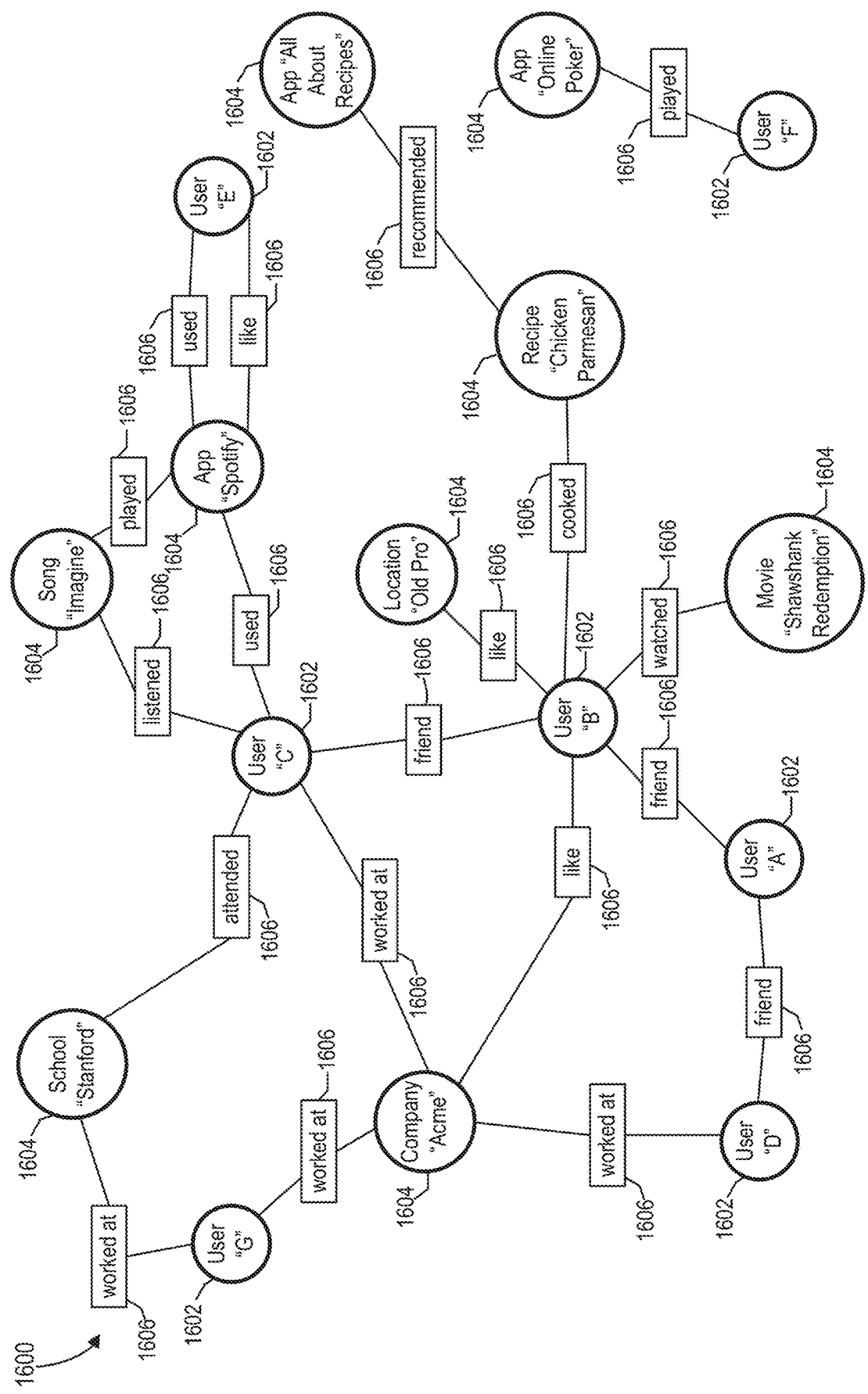
FIG. 16 illustrates an example social graph in accordance with one or more embodiments.

Moreover, as described in greater detail in FIG. 16, the virtual reality system 104 can utilize social graph information to determine a social graph affinity between the VR user and the co-user. Indeed, the affinity between the VR user and the co-user can represent the strength of a relationship or level of interest between the VR user and the co-user (e.g., based on the social graph information). For example, the virtual reality system 104 can measure and/or quantify an affinity between the VR user and the co-user using an affinity coefficient. Indeed, the virtual reality system 104 can utilize the affinity coefficient to represent or quantify the strength of a relationship between the VR user and the co-user. In particular, as described in greater detail in FIG. 16, the virtual reality system 104 can utilize a variety of factors and/or weights to calculate an affinity coefficient between the VR user and the co-user, including, as an example, user actions, types of relationships between the users, location information, other suitable factors, or any combination thereof. Additional detail for determining an affinity coefficient (or affinity score) between a VR user and a co-user based on social graph information is provided in FIG. 16 below.

Moreover, the virtual reality system 104 can utilize the number of connections, the number of interactions, the affinity coefficients, and/or any combination thereof to determine a social relevancy score between the VR user and/or co-user. In some embodiments, the virtual reality system 104 utilizes the affinity coefficient between the VR user and the co-user as the social relevancy score. In one or more embodiments, the virtual reality system 104 can determine the social relevancy score based on an accumulation of the number of social connections, the number of interactions, the affinity coefficient, and/or any combination thereof from the social graph information. Furthermore, the virtual reality system 104 can also utilize one or more weights associated with the social connections and/or interactions (e.g., certain types of connections can be weighted to count as more than one social connection).

Additionally, the virtual reality system 104 can determine a social relationship type for a co-user with respect to a VR user using the social relevancy score (and/or the affinity coefficient) determined from the social graph information. For example, the virtual reality system 104 can associate a variety of social relationship types with a social relevance score range. For example, the virtual reality system 104 can associate a first social relationship type to a first range of social relevance scores, a second social relationship type to a second range of social relevance scores, and so forth. Indeed, FIG. 3 illustrates the virtual reality system 104 associating various social relationship types to various ranges of social relevance scores. Then, the virtual reality system 104 can select a social relationship type for a co-user based on the social relevance score determined between the co-user and the VR user (e.g., identifying which social relationship type the social relevance score corresponds with).

Moreover, the virtual reality system 104 can also determine a social relationship type for a co-user with respect to a VR user using the number of social connections and/or the number of interactions determined from the social graph information between the co-user and the VR user. For example, the virtual reality system 104 can associate a variety of social relationship types with threshold numbers of social connections and/or interactions. For example, the virtual reality system 104 can associate a first social relationship type to a first threshold number of social connections and/or interactions, a second social relationship type to a second threshold number of social connections and/or interactions, and so forth.

In addition, in one or more embodiments, the virtual reality system 104 assigns a specific social relationship type to a co-user in relation to a VR user based on identifying a specific indication in the social graph information between the co-user and the VR user. For example, the virtual reality system 104 can assign a social relationship type (e.g., a friend type) to a co-user based on identifying, from the social graph information, that the co-user and the VR user indicate each other as friends (e.g., exist on each other's friend list). As another example, the virtual reality system 104 can assign a social relationship type (e.g., a family member type) to a co-user based on identifying, from the social graph information, that the co-user and the VR user indicate each other as related (e.g., list each other as family). Moreover, the virtual reality system 104 can assign a social relationship type (e.g., a stranger type) to a co-user based on identifying, from the social graph information, that the VR user and the co-user do not have any significant interaction and/or relationship in the social graph information. Furthermore, the virtual reality system 104 can assign a social relationship type (e.g., a restricted type) to a co-user based on identifying, from the social graph information, that the VR user has indicated the co-user as a blocked user.

As mentioned above, the virtual reality system 104 can utilize and/or assign a variety of social relationship types. Indeed, the virtual reality system 104 can assign social relationship types that represent different levels of social relevancy between a co-user and a VR user (e.g., type 1, type 2, type 3, etc.). Moreover, the virtual reality system 104 can assign social relationship types to indicate a specific relationship such as, but not limited to a family member type, a close friend type, a casual friend type, an acquaintance type, a stranger type, or a restricted type. In particular, the virtual reality system 104 can utilize a family member type and/or close friend type assignment for a co-user that is related to and/or significantly interacts with a VR user (e.g., based on social connections, interactions, affinity coefficients, and/or other scores determined as described above). Furthermore, the virtual reality system 104 can utilize a stranger type assignment for a co-user that has no significant relation and/or interactions with a VR user. Additionally, the virtual reality system 104 can utilize a restricted type assignment for a co-user that has been blocked and/or black listed (e.g., within user preferences) by a VR user. Indeed, the virtual reality system 104 can utilize the various social relationship types based on the amount of social relevancy a co-user has with a VR user (e.g., based on social connections, interactions, affinity coefficients, and/or other scores determined as described above).

Furthermore, the virtual reality system 104 can assign and/or modify the range of social relevance score (or other thresholds) associated with one or more social relationship types based on VR environment factors. For instance, the virtual reality system 104 can modify the range of social relevance score that is associated with one or more social relationship types based on the event type of the VR environment. For example, when the event in the VR environment is determined to be a concert that includes a larger number of users, the virtual reality system 104 can utilize a smaller range of social relevance scores for a first social relationship type (e.g., to assign a smaller proportion of users to a first social relationship type compared to other social relationship types). Furthermore, as an example, when the event in the VR environment is determined to be a museum exhibition that includes a smaller number of users, the virtual reality system 104 can utilize a larger range of social relevance scores for a first social relationship type (e.g., to assign a larger proportion of users to a first social relationship type compared to other social relationship types).

Figure 9:
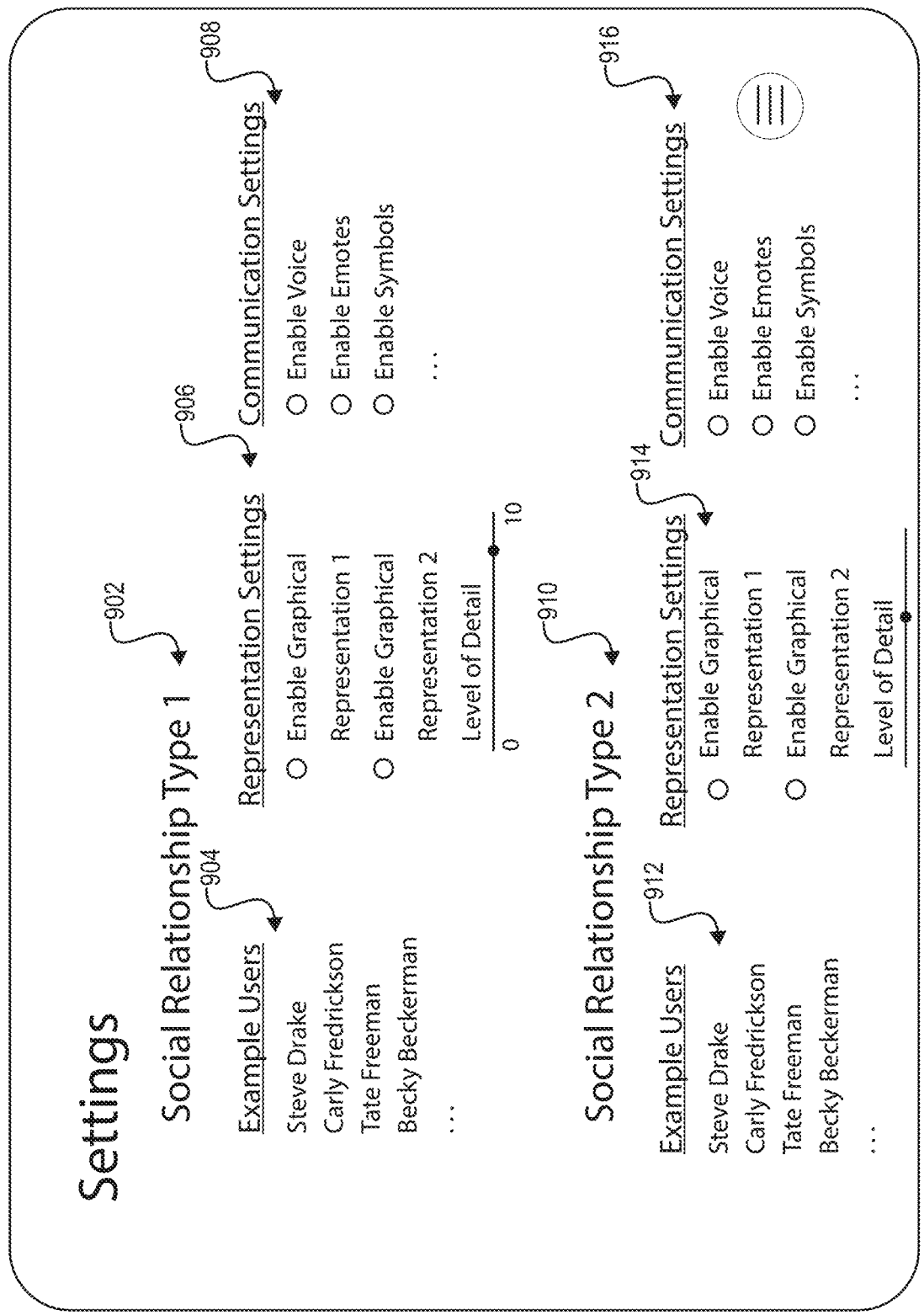
FIG. 9 illustrates an example of a virtual reality system displaying a graphical representation preference user interface in accordance with one or more embodiments.

As another example, the virtual reality system 104 can assign and/or modify the range of social relevance score (or other thresholds) associated with one or more social relationship types based on other factors such as the number of users present in the VR environment, whether the VR user invited a specific co-user to the VR environment (e.g., increases the level of social relevancy), and/or other preferences configured by the VR user (as described in greater detail in FIG. 9). Likewise, the virtual reality system 104 can assign and/or modify the number of social connections, number of interactions, the affinity coefficients, and/or other scores associated with social relationship types based one or any combination of the factors described herein.

In one or more embodiments, the virtual reality system 104 identifies and assigns social relationship types to a co-user within the VR environment based on a second order relationship between the co-user and the VR user. For instance, upon determining a social relationship type between a first co-user present within a VR environment and a VR user, the virtual reality system 104 can identify a second co-user within the VR environment that is socially relevant to the first co-user (using one or more approaches described above between the first co-user and the second co-user). Then, the virtual reality system 104 can utilize the social relevancy determined between the first co-user and the second co-user (e.g., a social relationship type between the two users) to determine a social relevancy between the VR user and the second co-user. Indeed, the virtual reality system 104 can utilize such a second order relationship in addition to the one or more approaches described above to determine a social relationship type between VR user and the second co-user.

For example, upon determining that a first co-user and the VR user have a first social relationship type and determining that the first co-user and the second co-user have a first social relationship type, the virtual reality system 104 can assign a second relationship type to the second co-user (with respect to the VR user) even if the VR user is determined to have no social relevancy with the second co-user. Indeed, the virtual reality system 104 can utilize identified second order relationships in VR environments to assign the same social relationship type and/or a social relationship type that is one level lower than the social relationship type assigned between a co-user and a VR user.

As an example, if within a VR environment, a best friend of a VR user appears (e.g., the first co-user) and the best friend's family member (e.g., the second co-user) appears within the VR environment, the virtual reality system 104 can assign the best friend of the VR user (e.g., the first co-user) with a first social relationship type (e.g., a close friend type). Furthermore, the virtual reality system 104 can originally determine a fourth social relationship type the best friend's family member (e.g., the second co-user) with respect to the VR user and then assign a second social relationship type (e.g., a casual friend type) to the best friend's family member based on the second order relationship. Indeed, the virtual reality system 104 can utilize any order of relationship to assign and/or modify a social relationship type and/or social relevance score between a co-user and a VR user.

Furthermore, although one or more embodiments herein describe the virtual reality system 104 determining a social relationship type (and/or social relevancy) between a co-user and a VR user, the virtual reality system 104 can determine social relevancy between any type of entity with respect to a VR user (e.g., a business and/or object within a VR environment). Additionally, the virtual reality system 104 can utilize the one or more approaches described above to determine a social relationship type (and/or social relevancy) with any number of co-users present within a VR environment. For example, FIG. 3 illustrates the virtual reality system 104 determining a social relationship type for multiple co-users within a VR environment in relation to a VR user.

As mentioned above, the virtual reality system 104 can determine a graphical representation for a co-user (within a VR environment) based on social graph information associated with the co-user and a VR user. In particular, the virtual reality system 104 can utilize one or more determinations described above (e.g., a number of social connections, number of interactions, affinity coefficient, and/or a social relevance score) from a social graph to determine a graphical representation for the co-user. Indeed, the virtual reality system 104 can select (or determine) graphical representations of varying levels of graphical detail for a co-user based on a social relevancy of the co-user with respect to the VR user.

Figure 4:
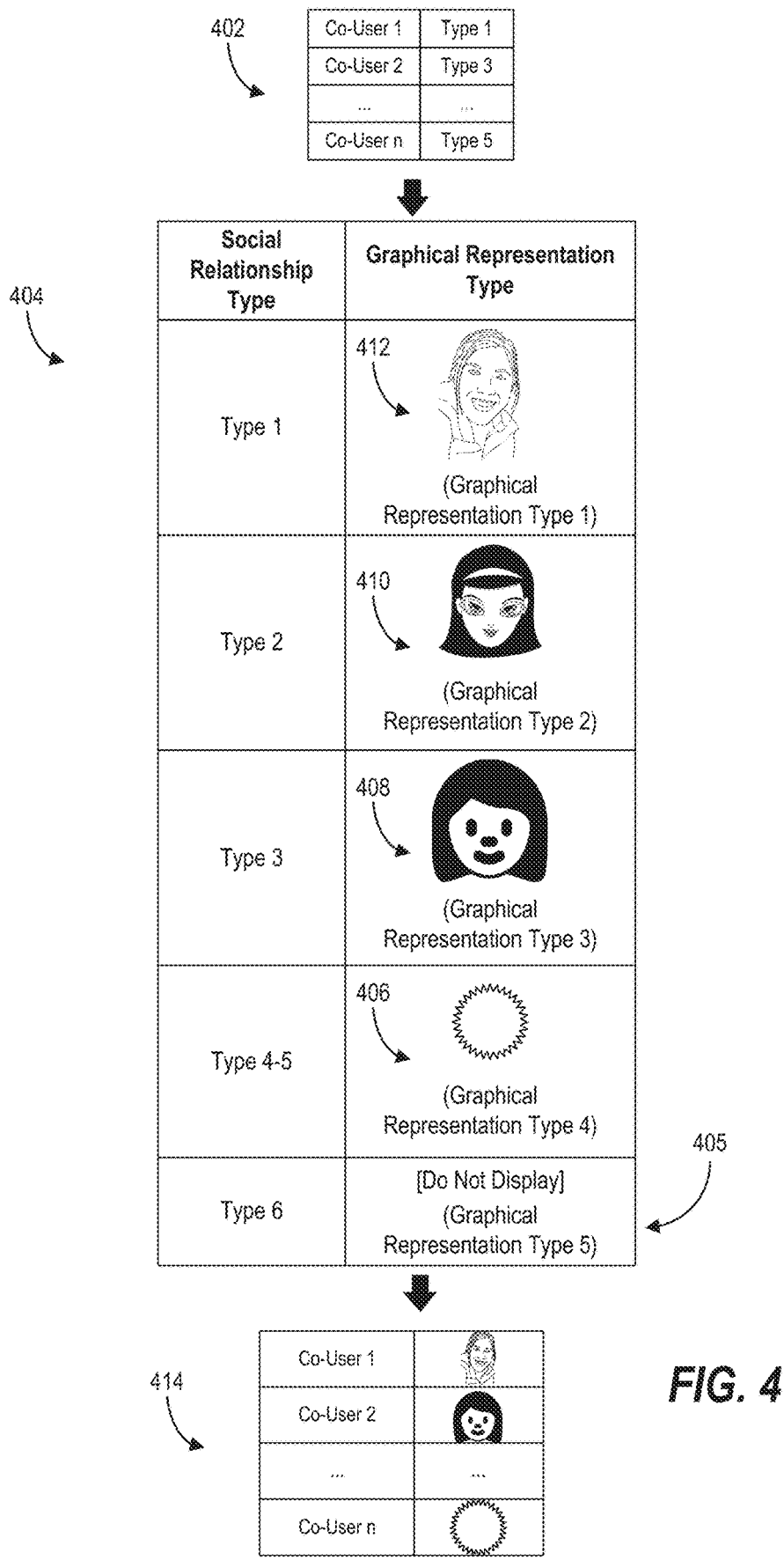
FIG. 4 illustrates a virtual reality system determining a graphical representation type for a co-user based on social graph information in accordance with one or more embodiments.

For example, FIG. 4 illustrates the virtual reality system 104 determining graphical representation types for co-users based on a social relevancy of the co-users with respect to a VR user. As shown in FIG. 4, the virtual reality system 104 determines social relationship types 402 for co-users (e.g., co-users 1 through n) based on social graph information (as described above). Then, as illustrated in FIG. 4, the virtual reality system 104 can select a graphical representation type from a graphical representation type reference table 404 based on the social relationship types 402 for the co-users (e.g., a graphical representation type specific to a social relationship type for a co-user). Indeed, as shown in FIG. 4, the virtual reality system 104 selects a first graphical representation type 412 for co-user 1 (e.g., based on co-user 1 having a social relationship type of "type 1") in the selected graphical representation types table 414. Moreover, as illustrated in FIG. 4, the virtual reality system 104 selects a third graphical representation type 408 for co-user 2 (e.g., based on co-user 2 having a social relationship type of "type 3") and selects a fourth graphical representation type 406 for co-user n (e.g., based on co-user n having a social relationship type of "type 5") in the selected graphical representation types table 414.

As shown in FIG. 4, the virtual reality system 104 can utilize various levels of graphical detail for graphical representation types. For instance, as illustrated in FIG. 4, the virtual reality system 104 can utilize a first level of graphical detail for the first graphical representation type 412 (e.g., a high-resolution avatar). Furthermore, as shown in FIG. 4, the virtual reality system 104 can utilize a second level of graphical detail for the second graphical representation type 410 (e.g., a standard avatar). Also, as shown in FIG. 4, the virtual reality system 104 can utilize a third level of graphical detail for the third graphical representation type 408 (e.g., an indistinct avatar). In addition, as illustrated in FIG. 4, the virtual reality system 104 can also utilize a fourth level of graphical detail for the fourth graphical representation type 406 (e.g., a dot). Finally, as shown in FIG. 4, the virtual reality system 104 can utilize a fifth level of graphical detail for the fifth graphical representation type 405 (e.g., no displayed embodiment or no display).

Moreover, as illustrated in FIG. 4, the virtual reality system 104 associates the highest graphical detail to the first graphical representation type 412 (which corresponds to a higher social relationship type). Furthermore, as shown in FIG. 4, the virtual reality system 104 associates the least graphical detail to the fourth graphical representation type 406 (which corresponds to a lesser social relationship type). In addition, in reference to FIG. 4, the virtual reality system 104 can utilize the selected graphical representation types table 414 to render the co-users in a VR environment for the VR user using the corresponding graphical representation types (as described in greater detail below).

As an example, in reference to FIG. 4, the virtual reality system 104 can utilize a high-resolution avatar as the first graphical representation type 412. In particular, the virtual reality system 104 can utilize a high-resolution avatar, to depict a co-user, that is capable of highly emotive exchanges within a VR environment. Furthermore, the virtual reality system 104 can utilize a high-resolution avatar to depict a co-user realistically and/or with life-like detail (e.g., an accurate portrayal of the co-user's true appearance by using greater graphical detail). Moreover, the virtual reality system 104 can enable a high-resolution avatar to occupy physical space within a VR environment (e.g., a high-resolution avatar can be non-transparent, can interact with objects and/or the VR user, and/or can have rigid body properties such that the high-resolution avatar responds to physics-based rules of the VR environment). In some embodiments, the virtual reality system 104 can utilize a live broadcast of a person and/or a scanned representation of the person as the high-resolution avatar.

Furthermore, in reference to FIG. 4, the virtual reality system 104 can utilize a standard avatar as the second graphical representation type 410. More specifically, the virtual reality system 104 can utilize a standard avatar to depict a co-user using a simplified (e.g., animated, caricature-like, cartoon-like) three-dimensional representation (e.g., less graphical detail compared to a high-resolution avatar). Indeed, the virtual reality system 104 can utilize standard avatar that is customizable and/or has individual variety (e.g., configured by the VR user and/or each co-user). In one or more embodiments, the virtual reality system 104 enables standard avatars to occupy physical space within a VR environment (e.g., a standard avatar can be non-transparent, can interact with objects and/or the VR user, and/or can have rigid body properties such that the standard avatar responds to physics-based rules of the VR environment.

Additionally, in reference to FIG. 4, the virtual reality system 104 can utilize an indistinct avatar as the third graphical representation type 408. In particular, the virtual reality system 104 can utilize an indistinct avatar to depict a co-user using a basic three-dimensional representation (e.g., using a basic figure, shape, and/or characteristic of a person). Indeed, the virtual reality system 104 can enable an indistinct avatar to be passive within a VR environment (e.g., the indistinct avatar can be semi-transparent, does interact with objects in the VR environment, can be enabled to fade away from display when approached by the VR user, and/or does not respond to physics-based rules of the VR environment). In some embodiments, the virtual reality system 104 can utilize indistinct avatars to indicate that co-users that are less socially relevant to a VR user are present within the VR environment (e.g., provide a sense of a crowd in a VR environment). In some embodiments, the virtual reality system 104 provides less graphical detail to an indistinct avatar compared to a standard avatar.

Moreover, in reference to FIG. 4, the virtual reality system 104 can utilize a dot as the fourth graphical representation type 406. In particular, the virtual reality system 104 can utilize a visual point of light (or a floating spot) to portray a co-user within a VR environment. For instance, the virtual reality system 104 can enable a dot to be passive within a VR environment (e.g., the dot can be semi-transparent, can be floating, cannot interact with objects within the VR environment, can be of any shape, and/or can be non-responsive to physics-based rules of the VR environment). Indeed, the virtual reality system 104 can enable dots to unobtrusively indicate a one or more co-users' presence within a VR environment (e.g., by not blocking the view of a point of interest within a VR environment and/or other co-users that are more socially relevant to a VR user). Additionally, the virtual reality system 104 can enable dots to move within the VR environment to indicate the presence and/or position of a co-user that is portrayed as a dot. Indeed, the virtual reality system 104 can provide less graphical detail to a dot compared to an indistinct avatar.

In addition, in reference to FIG. 4, the virtual reality system 104 can utilize a "do not display" type as the fifth graphical representation type 405. Specifically, the virtual reality system 104 can prevent the display of and/or remove from display a co-user within a VR environment. Indeed, the virtual reality system 104 can make a co-user invisible to a VR user within a VR environment as the fifth graphical representation type 405. Although FIG. 4 illustrates the virtual reality system 104 selecting a graphical representation type from five different graphical representation types, the virtual reality system 104 can select and/or determine any number of graphical representation types based on social graph information between a co-user and a VR user.

Furthermore, as illustrated in FIG. 4, the virtual reality system 104 can utilize associations between graphical representation types and social relationship types to select a graphical representation type for a co-user based on social graph information between the co-user and a VR user (e.g., the graphical representation type reference table 404). Indeed, the virtual reality system 104 can configure and/or set associations between graphical representation types and social relationship types based on, but not limited to, settings provided by an administrator of the VR environment, preferences provided by a VR user (as described below), settings provided by a social network system, and/or settings set by a VR environment developer. Furthermore, as an example, the virtual reality system 104 can set the associations between the graphical representation types and the social relationship types by utilizing a cross reference table/index and/or labels and/or tags corresponding to each graphical representation type.

Moreover, in addition to or in alternate to utilizing associations between graphical representation types and social relationship types to determine a graphical representation type for a co-user, the virtual reality system 104 can also utilize associations between other information determined from the social graph information to determine a graphical representation type for a co-user. For example, the virtual reality system 104 can utilize (and/or set) associations between threshold numbers of social connections and/or interactions determined from the social graph information (e.g., one or more graphical representation types correspond to one or more threshold numbers of social connections and/or interactions). Furthermore, as an example, the virtual reality system 104 can utilize (and/or set) associations between ranges of social relevance scores and/or affinity coefficients from the social graph information (e.g., one or more graphical representation types correspond to different score ranges of a social relevance score and/or affinity coefficient).

Additionally, the virtual reality system 104 can associate social relationship types (or other information determined from social graph information) with one or more graphical representation types based on VR environment factors. For instance, the virtual reality system 104 can associate social relationship types based on the event type of the VR environment. For instance, when the event in the VR environment is determined to be a concert that includes a larger number of users, the virtual reality system 104 can associate a first social relationship type (e.g., a family member type and/or close friend type) to a graphical representation type that corresponds to a standard avatar (e.g., to enable a VR environment to include a larger number of co-users within the VR environment). Furthermore, as an example, when the event in the VR environment is determined to be a museum exhibition that includes a smaller number of users, the virtual reality system 104 can associate both a first social relationship type (e.g., a family member type and/or close friend type) and a second social relationship type (e.g., a casual friend type) to a graphical representation type that corresponds to a high-resolution avatar (e.g., to portray a larger proportion of co-users with more graphical detail when the VR environment has a smaller crowd size).

As another example, the virtual reality system 104 can associate social relationship types (or other information determined from social graph information) with one or more graphical representation types based on other factors such as the number of users present in the VR environment, whether the VR user invited a specific co-user to the VR environment (e.g., increases the level of social relevancy and/or graphical representation), and/or other preferences configured by the VR user (as described in greater detail in FIG. 9). Likewise, the virtual reality system 104 can associate other information determined from social graph information (e.g., a threshold numbers of social connections and/or interactions the number of social connections and/or ranges of social relevance scores and/or affinity coefficient) based one or any combination of the factors described herein. Indeed, the virtual reality system 104 can include multiple sets of associations (e.g., multiple sets of cross reference tables and/or tags, etc.) between any combination of social relevance information and graphical representation types for different combinations of factors and/or circumstances described above (e.g., VR environment event type, VR environment venue type, invitation types, plans to meet within a VR environment, co-user population, VR user preferences, relationship order between a co-user and VR user, etc.).

Additionally, the virtual reality system 104 can control and/or limit the number of co-users within a VR environment that are assigned to a graphical representation type based on the different combinations of factors and/or circumstances described above. For example, when a VR environment includes a high number of co-users (e.g., based on a threshold number of co-users), the virtual reality system 104 can set a threshold limit for the one or more graphical representation types (e.g., set a first threshold number of co-users that can be assigned the first graphical representation type of highest graphical detail, a second threshold number of co-users that be assigned the second graphical representation type, and assign the remaining co-users to a graphical representation type that corresponds to the lowest graphical detail). Indeed, the virtual reality system 104 can also control and/or limit the number of co-users within a VR environment that are assigned to a graphical representation type based on other factors such as event types, venue types, and/or user preferences. Furthermore, the virtual reality system 104 can indicate (e.g., using a glowing outline and/or other graphic-based element) that a co-user can be displayed in a higher graphical representation type based on an existing social relevancy when the co-user is displayed using a lesser graphical representation type due to a limit on the number of co-users that are assigned to the higher graphical representation type.

Furthermore, although one or more embodiments herein describe the virtual reality system 104 determining a graphical representation type for a co-user within a VR environment, the virtual reality system 104 can determine a graphical representation type for any type of entity within a VR environment (e.g., a business and/or object within a VR environment) based on a social relevancy (or affinity) between the VR user and the entity from social graph information. Additionally, the virtual reality system 104 can utilize the one or more approaches described above to determine graphical representation type based on social graph information for any number of co-users present within a VR environment (e.g., FIG. 4 illustrates the virtual reality system 104 determining graphical representation types for multiple co-users within a VR environment).

Figure 5:
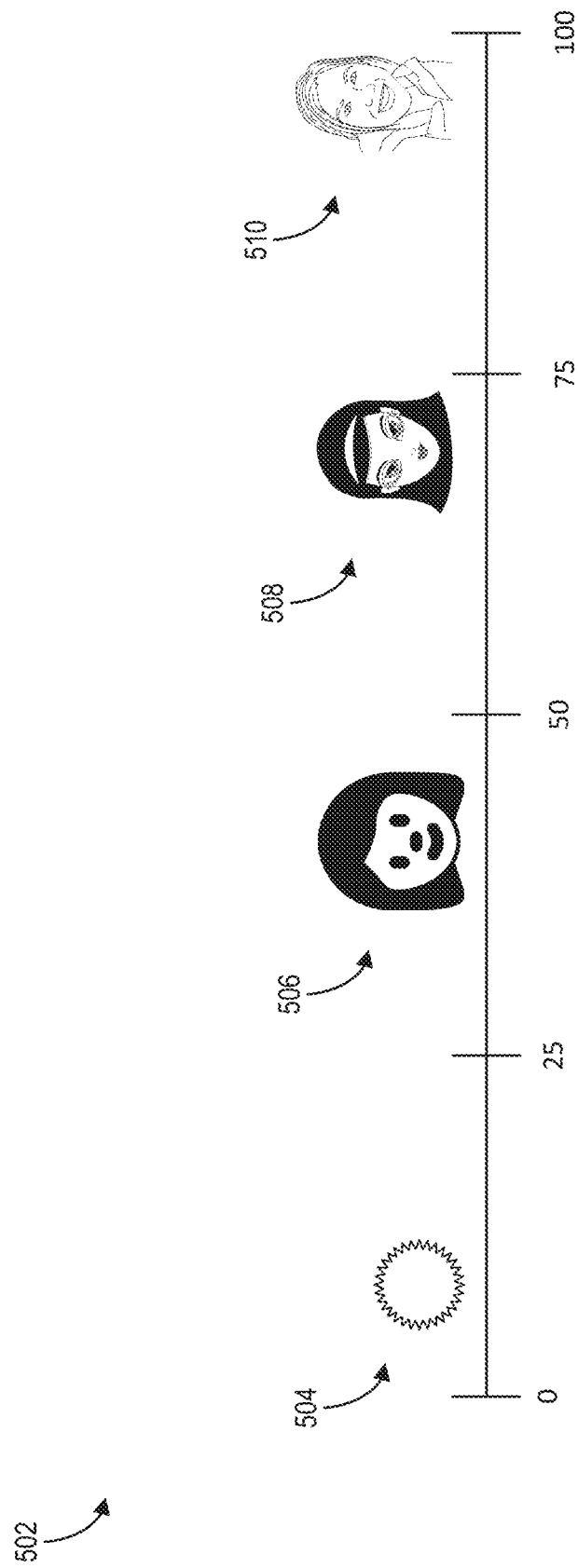
FIG. 5 illustrates a virtual reality system determining a graphical representation type for a co-user using a sliding scale based on social graph information in accordance with one or more embodiments.

In one or more embodiments, the virtual reality system 104 can determine a graphical representation type (and/or level of graphical detail for the graphical representation) of a co-user by utilizing a sliding scale. In particular, the virtual reality system 104 can increase the graphical representation type (and/or level of graphical detail) of a co-user within a VR environment as the social relationship type of the co-user increases. For example, FIG. 5 illustrates an example graphical detail sliding scale 502. As shown in FIG. 5, the virtual reality system 104 can utilize a graphical detail sliding scale 502 that indicates a social relevance score (e.g., 0 to 100). Furthermore, as illustrated in FIG. 5, based on a social relevance score of a co-user, the virtual reality system 104 can utilize a different level of graphical detail.

As an example, referring to FIG. 5, the virtual reality system 104 can utilize minimal graphical detail and/or a fourth graphical representation type 504 (e.g., a dot) when a co-user has a social relevance score below 25. Additionally, as shown in FIG. 5, the virtual reality system 104 can utilize an increasing amount of graphical detail as the social relevancy score increases on the graphical detail sliding scale 502. For example, as shown in FIG. 5, the virtual reality system 104 can utilize a third graphical representation type 506 corresponding to an indistinct avatar when a co-user has a social relevancy score of 25 through 50. Moreover, as illustrated in FIG. 5, the virtual reality system 104 can utilize a second graphical representation type 508 corresponding to a standard avatar when a co-user has a social relevance score of 50 through 75. In addition, the virtual reality system 104 can utilize a first graphical representation type 510 corresponding to a high-resolution avatar when a co-user has a social relevancy score of 75 through 100. Although not shown in FIG. 5, the virtual reality system 104 can also provide no graphical detail (e.g., not display a co-user) when a co-user has a social relevance score of 0 (e.g., to represent a restricted social relationship type based on the co-user being blocked by a VR user).

Moreover, in addition to or in alternate to utilizing a sliding scale that uses a social relevance score to determine a graphical representation type for a co-user, the virtual reality system 104 can also utilize a sliding scale that uses other information determined from the social graph information to determine a graphical representation type for a co-user. For example, the virtual reality system 104 can utilize a sliding scale that uses a number of social connections and/or interactions determined from the social graph information (e.g., the level of graphical detail of a co-user increases as the number of social connections and/or interactions increases). Furthermore, as an example, the virtual reality system 104 can utilize a sliding scale that uses an affinity coefficient from the social graph information (e.g., the level of graphical detail of a co-user increases as the affinity coefficient increases).

Additionally, the virtual reality system 104 can update social relevancies between co-users and VR users in real time. For example, the virtual reality system 104 can receive updates to one or more social graphs and update any combination of social relationship types, social relevance scores, social connections count, social interactions count, affinity coefficients, etc. Furthermore, the virtual reality system 104 can also update a graphical representation type for a co-user based on real-time changes in social relevancy. Moreover, the virtual reality system 104 can also update associations between social relevancies and graphical representation types (e.g., upon receiving a preference change from the VR user). As mentioned above, the virtual reality system 104 can perform such changes in real-time (e.g., the graphical representation type and/or social relevance type can change while the co-user is attending the VR environment).

Figure 6:
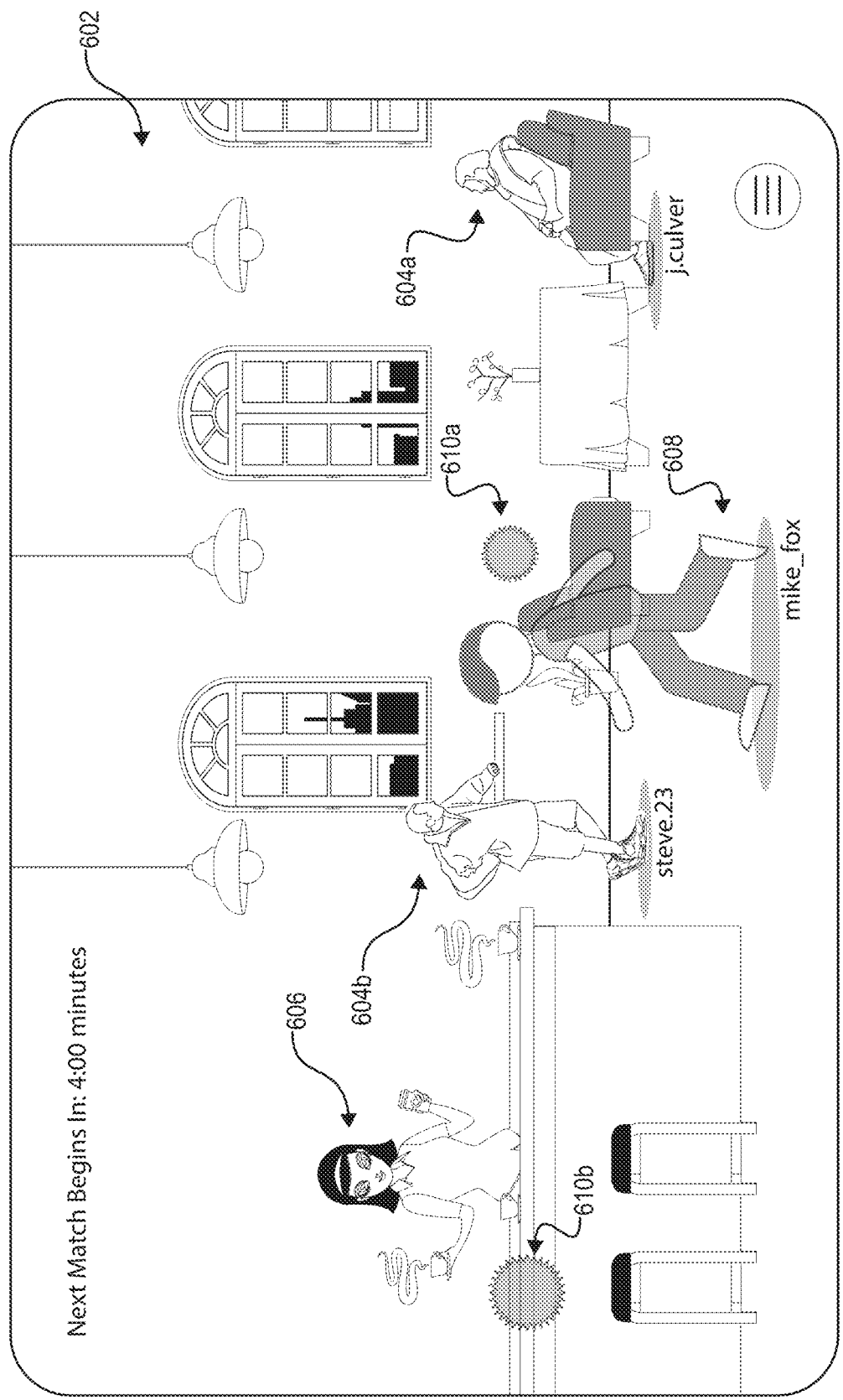
FIG. 6 illustrates an example of a virtual reality system operating in a virtual reality scene in accordance with one or more embodiments.

As mentioned above, the virtual reality system 104 can display one or more determined graphical representation types to represent one or more co-users (or virtual user identities associated with the co-users) within a VR environment (e.g., display the one or more co-users using the graphical representation types). For example, FIG. 6 illustrates the virtual reality system 104 displaying various co-users that are present within a VR environment 602 with graphical representation types selected based on social graph information of the co-users. Indeed, the virtual reality system 104 can determine and/or select the social relationship types and/or graphical representation types for the co-users in accordance with one or more embodiments herein. Then, the virtual reality system 104 can display the co-users within the VR environment (from the perspective of a VR user) using the selected graphical representation types. Although FIG. 6 illustrates a VR environment 602 (e.g., a waiting lobby area for a video game session), the virtual reality system 104 can display and/or select graphical representation types for any number of co-users in any number of VR environments (e.g., VR based concerts, VR based lectures, VR based sporting events, VR based tours, etc.).

In particular, as shown in FIG. 6, the virtual reality system 104 can display co-users 604a and 604b having a first social relationship type with respect to a VR user (e.g., the user viewing the VR environment) using a first graphical representation type (e.g., a high-resolution avatar). Furthermore, as shown in FIG. 6, the virtual reality system 104 can display co-user 606 having a second social relationship type using a second graphical representation type (e.g., a standard avatar). Moreover, as also illustrated in FIG. 6, the virtual reality system 104 can display co-user 608 having a third social relationship type using a third graphical representation type (e.g., an indistinct avatar). Lastly, as shown in FIG. 6, the virtual reality system 104 can also display co-users 610a and 610b having a fourth social relationship type using a fourth graphical representation type (e.g., a dot).

As mentioned above, the virtual reality system 104 can determine a communication capability for a co-user (within a VR environment) based on social graph information between the co-user and a VR user. In particular, the virtual reality system 104 can utilize the one or more determinations described above (e.g., a number of social connections, number of interactions, affinity coefficient, and/or a social relevance score) from a social graph to determine one or more communication capabilities for the co-user. Indeed, the virtual reality system 104 can select (or determine) communication capabilities of varying levels for a co-user based on a social relevancy of the co-user with respect to the VR user.

Figure 7:
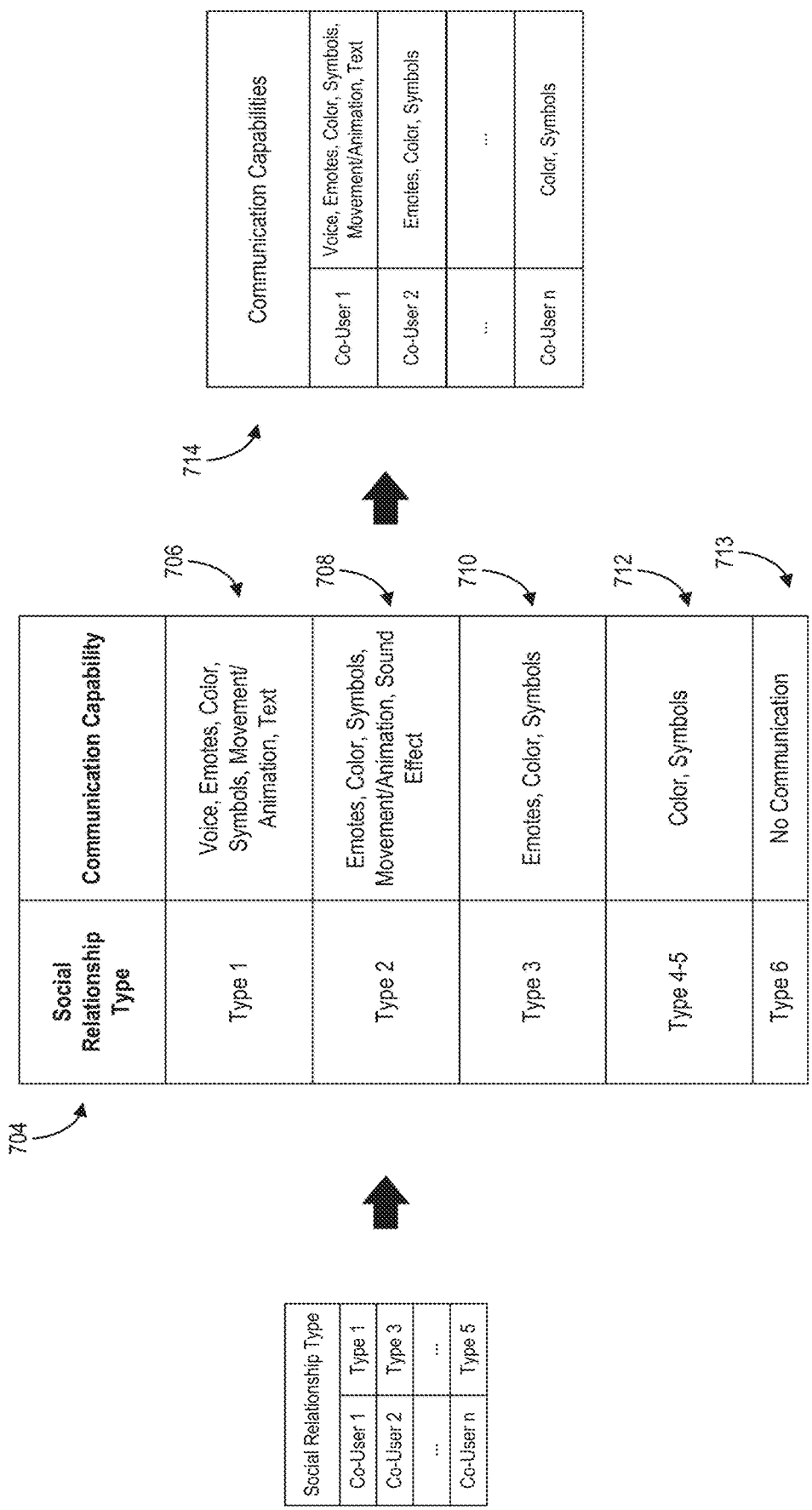
FIG. 7 illustrates a virtual reality system determining a communication capability for a co-user based on social graph information in accordance with one or more embodiments.

For instance, FIG. 7 illustrates the virtual reality system 104 determining one or more communication capabilities for co-users based on a social relevancy of the co-users with respect to a VR user. As illustrated in FIG. 7, the virtual reality system 104 determines social relationship types 702 for co-users (e.g., co-users 1 through n) based on social graph information (as described above). Moreover, as shown in FIG. 7, the virtual reality system 104 can select one or more communication capabilities from a communication capability reference table 704 based on the social relationship types 702 for the co-users. Indeed, as shown in FIG. 7, the virtual reality system 104 selects a first set of communication capabilities 706 for co-user 1 (e.g., based on co-user 1 having a social relationship type of "type 1") in the selected communication capabilities table 714. Moreover, as illustrated in FIG. 7, the virtual reality system 104 selects a third set of communication capabilities 710 for co-user 2 (e.g., based on co-user 2 having a social relationship type of "type 3") and selects a fourth set of communication capabilities 712 for co-user n (e.g., based on co-user n having a social relationship type of "type 5") in the selected communication capabilities table 714. Indeed, the virtual reality system 104 can utilize the selected communication capabilities table 714 to provide the co-users with the corresponding communication capabilities with a VR environment (as described in greater detail below).

As shown in FIG. 7, the virtual reality system 104 can utilize (and/or provide) various types of communication capabilities. For instance, as illustrated in FIG. 7, the virtual reality system 104 can provide the first set of communication capabilities 706 that provide for greater communication in a VR environment (e.g., voice, emotes, color, symbols, and movement/animation). Furthermore, as shown in FIG. 7, the virtual reality system 104 can provide a second set of communication capabilities 708 (e.g., emotes, color, symbols, and movement/animation). Also, as shown in FIG. 7, the virtual reality system 104 can provide the third set of communication capabilities 710 (e.g., emotes, color, and symbols). In addition, as illustrated in FIG. 7, the virtual reality system 104 can also provide the fourth set of communication capabilities 712 (e.g., color). Finally, as shown in FIG. 7, the virtual reality system 104 can provide a fifth communication capability 713 (e.g., no communication capabilities). Indeed, as illustrated in FIG. 7, the virtual reality system 104 can provide less communication capabilities as the social relationship type corresponds to less social relevancy between a co-user and a VR user.

As an example, the virtual reality system 104 can provide a voice-based communication capability to a co-user. In particular, the virtual reality system 104 can enable a co-user to use voice chat within a VR environment with a VR user when the co-user is provided with voice-based communication capabilities. In some embodiments, the virtual reality system 104 provides a text-based communication capability to a co-user. More specifically, the virtual reality system 104 can enable a co-user to use text messaging (e.g., via text bubbles) within a VR environment when the co-user is provided with text-based communication capabilities.

Furthermore, the virtual reality system 104 can also provide a emote-based communication capability to a co-user. In particular, the virtual reality system 104 can enable a co-user to use emotes (e.g., a set of predefined animations that are performed by the graphical representation of a co-user) within a VR environment when the co-user is provided with emote-based communication capabilities. Moreover, the virtual reality system 104 can also provide an animation-based and/or a movement-based communication capability to a co-user. In particular, the virtual reality system 104 can enable a co-user to use animations and/or movements (e.g., animations and/or movements that are performed by the graphical representation of a co-user based on facial, hand, and/or other body movements tracked for a co-user) within a VR environment when the co-user is provided with animation-based and/or movement-based communication capabilities.

Additionally, the virtual reality system 104 can also provide a symbol-based (and/or iconic-based) communication capability to a co-user. In particular, the virtual reality system 104 can enable a co-user to use symbols and/or icons (e.g., a thumbs up, heart, laughing emoji, wow emoji, sad emoji, angry emoji, etc.) within a VR environment when the co-user is provided with symbol-based communication capabilities. Furthermore, the virtual reality system 104 can also provide a sound effect-based communication capability to a co-user. In particular, the virtual reality system 104 can enable a co-user to use sound effects (e.g., a laughing sound effect, applauding sound effect, a confirmation sound effect, a booing sound effect, etc.) within a VR environment when the co-user is provided with sound effect-based communication capabilities. In addition, the virtual reality system 104 can also provide a color-based communication capability to a co-user. Indeed, the virtual reality system 104 can enable a co-user to use colors (e.g., colors and/or brightness corresponding to different emotions such as red for anger, yellow for happiness, blue for cheering, etc.) within a VR environment when the co-user is provided with color-based communication capabilities. In some embodiments, the virtual reality system 104 can provide no communication capabilities to a co-user (e.g., for a co-user having a restricted social relationship type due to being blocked).

Furthermore, as illustrated in FIG. 7, the virtual reality system 104 can utilize associations between one or more communication capabilities and social relationship types to select communication capabilities for a co-user based on social graph information between the co-user and a VR user. Indeed, the virtual reality system 104 can configure and/or set associations between one or more communication capabilities and social relationship types in accordance with one or more embodiments herein (e.g., by using similar approaches used for determining graphical representation types above). Furthermore, the virtual reality system 104 can utilize associations between other information determined from the social graph information to determine one or more communication capabilities for a co-user in accordance with one or more embodiments herein (e.g., by using a number of social connections and/or interactions and/or ranges of social relevance scores and/or affinity coefficients).

Additionally, the virtual reality system 104 can associate social relationship types (or other information determined from social graph information) with one or more communication capabilities based on VR environment factors and/or circumstances described above in accordance with one or more embodiments herein (e.g., by using similar approaches used for determining graphical representation types based on VR environment factors above). Likewise, the virtual reality system 104 can control and/or limit the number of co-users within a VR environment that are provided with a communication capability based on different combinations of factors and/or circumstances described above (in accordance with one or more embodiments herein). Additionally, the virtual reality system 104 can also assign communication capabilities to co-users that have social relationship types based on second order relationships in accordance with one or more embodiments herein.

Furthermore, although one or more embodiments herein describe the virtual reality system 104 providing one or more communication capabilities to a co-user within a VR environment, the virtual reality system 104 can provide one or more communication capabilities to any type of entity within a VR environment (e.g., a business and/or object within a VR environment) based on a social relevancy (or affinity) between the VR user and the entity from social graph information. Additionally, the virtual reality system 104 can utilize the one or more approaches described above to provide communication capabilities based on social graph information for any number of co-users present within a VR environment (e.g., FIG. 7 illustrates the virtual reality system 104 providing various communication capabilities for different co-users within a VR environment).

Additionally, the virtual reality system 104 can also provide communication capabilities to a co-user by utilizing a sliding scale in accordance with one or more embodiments herein. In particular, the virtual reality system 104 can increase the various modes of communication available for a co-user as the social relationship type increases. Indeed, the virtual reality system 104 can utilize a sliding scale in accordance with one or more embodiments herein (e.g., by using similar approaches used for determining graphical representation types above) to provide communication capabilities to a co-user within a VR environment based on social relevancy between the co-user and a VR user.

Furthermore, the virtual reality system 104 can also update communication capabilities provided to a co-user in real time in accordance with one or more embodiments herein. For instance, the virtual reality system 104 can receive updates to one or more social graphs and update communication capabilities of a co-user based on the received updates to the one or more social graphs in accordance with one or more embodiments herein (e.g., by using similar approaches used for updating graphical representation types in real time above). Indeed, the virtual reality system 104 can perform such changes in real-time (e.g., the communication capabilities and/or social relevance type can change while the co-user is attending the VR environment).

Additionally, the virtual reality system 104 can also configure (and/or determine) other settings and/or properties for a co-user based on social graph information. For example, the virtual reality system 104 can utilize any of or any combination of approaches described above to determine settings and/or properties such as a co-user's interaction capabilities and/or a co-user's viewing capabilities within the VR environment. For instance, the virtual reality system 104 can determine the level of interaction available to a co-user within a VR environment based on the social relevancy of the co-user in accordance with one or more embodiments herein (e.g., whether the co-user can interact with objects, other co-users, the VR user within the VR environment and/or modify the VR environment). Furthermore, the virtual reality system 104 can determine in which way the co-user is capable of viewing other co-users, the VR user, and/or the VR environment based on social relevancy in accordance with one or more embodiments herein (e.g., the graphical representation the co-user perceives for other users in the VR environment).

Figure 8:
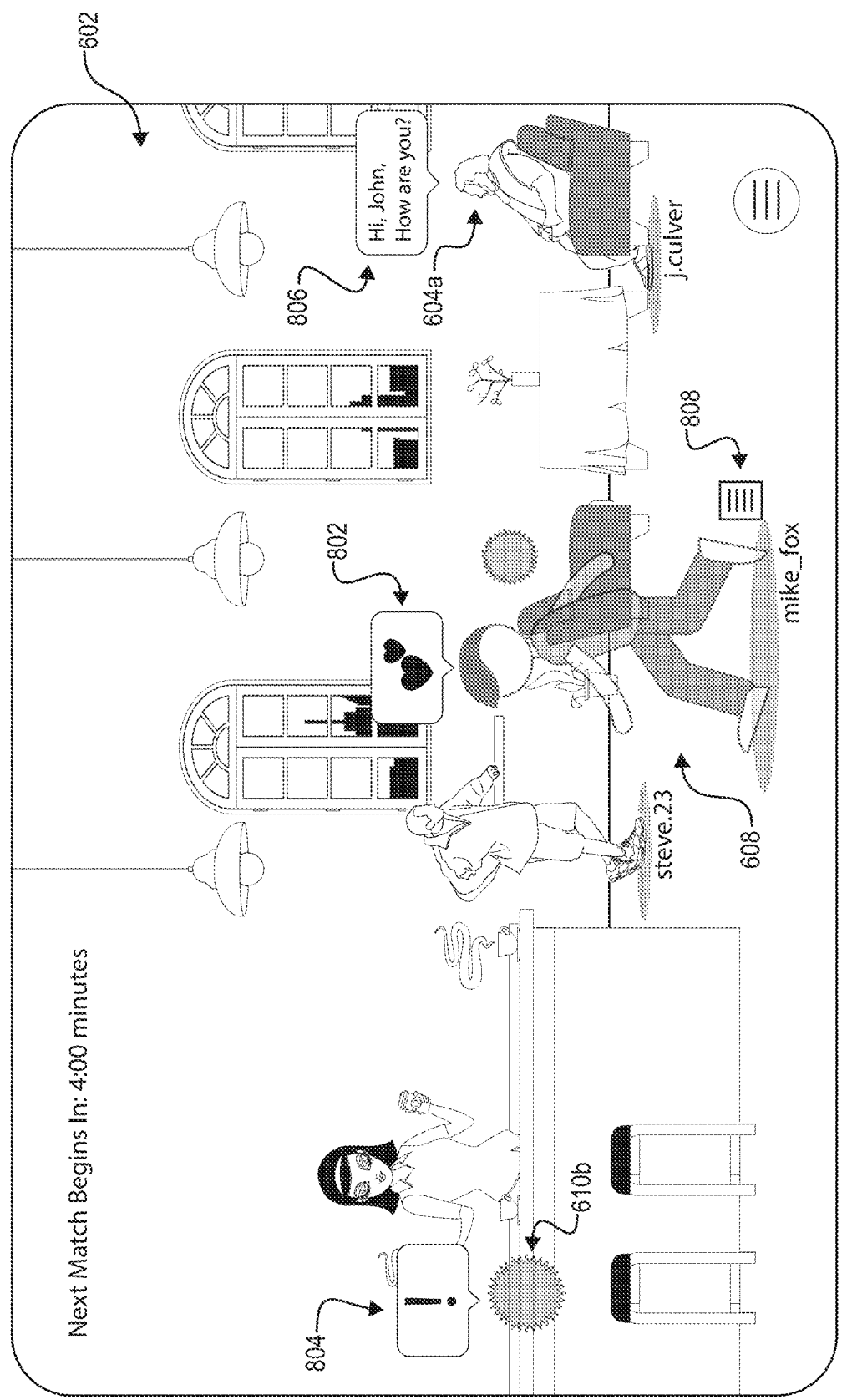
FIG. 8 illustrates an example of a virtual reality system operating in a virtual reality scene in accordance with one or more embodiments.

As mentioned above, the virtual reality system 104 can enable one or more co-users to communicate within a VR environment using one or more communication capabilities provided based on social graph information. For instance, FIG. 8 illustrates the virtual reality system 104 enabling various co-users that are present within the VR environment 602 to communicate via communication capabilities determined based on social graph information. Indeed, the virtual reality system 104 can determine and/or select one or more communication capabilities based on social graph information in accordance with one or more embodiments. Then, the virtual reality system 104 enable the co-users within the VR environment to communicate with a VR user using the selected one or more communication capabilities.

More specifically, as shown in FIG. 8, the virtual reality system 104 can enable co-user 604a having a first social relationship type to use voice chat 806. Moreover, as illustrated in FIG. 8, the virtual reality system 104 can enable co-user 608 having a third social relationship type to use symbol-based communications 802. Additionally, as shown in FIG. 8, the virtual reality system 104 can enable co-user 610b having a fourth relationship type to use symbol-based communications 804. Although FIG. 8 demonstrates one or more communication capabilities for co-users within the VR environment 602, the virtual reality system 104 can provide any of or any combination of communication capabilities to co-users in accordance with one or more embodiments herein. Furthermore, in reference to FIG. 8, the virtual reality system 104 can provide any combination of graphical representation types, communication capabilities, and/or other capabilities/properties to co-users within a VR environment in accordance with one or more embodiments herein.

In addition, the virtual reality system 104 can also aggregate one or more communications of co-users within the VR environment. For example, the virtual reality system 104 can detect one or more communications from co-users that have a color-based communication capability enabled and aggregate the colors expressed by those co-users (e.g., corresponding to a specific emotion). Then, the virtual reality system 104 can display, within a VR environment, the aggregated colors as an ambient communication and/or reaction (e.g., ambient cheering at a VR based concert, etc.). Indeed, the virtual reality system 104 can aggregate any type of communication for multiple co-users within a VR embodiment to present an ambient communication (e.g., a less obtrusive communication from multiple co-users). As an additional example, the virtual reality system 104 can aggregate body movement of multiple co-users to represent an expression of emotional energy and/or emotional excitement (e.g., dancing during a VR based concert).

Furthermore, the virtual reality system 104 can also display a selectable option within the VR environment for any number of co-users within the VR environment. For example, FIG. 8 illustrates the virtual reality system 104 providing a selectable option 808 for the co-user 608 within the VR environment 602. Indeed, upon detecting an interaction with the selectable option 808, the virtual reality system 104 can provide a user interface to enable a VR user to change preferences corresponding to the co-user 608. For example, the virtual reality system 104 can enable a VR user to set and/or change preferences such as graphical representation types for the co-user 608 (e.g., change from an indistinct avatar to a high-resolution avatar). Moreover, the virtual reality system 104 can enable the VR user to set and/or change preferences such as communication capabilities for the co-user 608 (e.g., change from a symbol-based communication capability to a voice-based communication capability). Furthermore, upon detecting an interaction with a selectable option, the virtual reality system 104 can also provide information corresponding to a co-user (e.g., display how the VR user is related to the co-user, the number of connections that exist for the co-user, mutual friends, etc.). Indeed, the virtual reality system 104 can provide a selectable option for each of the co-users present within a VR environment to enable a VR user to individually change one or more properties and/or capabilities (described above) for the co-users.

As mentioned above, the virtual reality system 104 can receive preferences (e.g., graphical representation preference information) corresponding to graphical representations and/or other properties of co-users based on social graph information. In particular, the virtual reality system 104 can provide (and/or display) a user interface to a VR user to set and/or configure preferences corresponding to graphical representations and/or other properties of co-users based on social graph information. In one or more embodiments, the virtual reality system 104 enables a VR user to set and/or configure preferences based on social graph information prior to being present within a VR environment. Indeed, by enabling a VR user to set and/or configure preferences based on social graph information prior to being present within a VR environment, the virtual reality system 104 can automatically render co-users within a VR environment using such preferences upon determining social relevancies for the co-users (e.g., determine a graphical representation type and/or other information automatically using social relevancies). In particular, the virtual reality system 104 enables the rendering of co-users within VR environments using graphical representation types and/or other properties (in accordance with one or more embodiments herein) without having to having the VR user individually select such properties when entering a VR environment.

In particular, FIG. 9 illustrates the virtual reality system 104 displaying a user interface (e.g., within a VR interface) to set and/or configure preferences for corresponding to graphical representations and/or other properties of co-users based on social graph information. As shown in FIG. 9, the virtual reality system 104 can display preferences corresponding to a first social relationship type 902. Moreover, as illustrated in FIG. 9, the virtual reality system 104 can determine and display, from a social graph corresponding to the VR user, one or more example users 904 that may be assigned to the first social relationship type 902. Moreover, as shown in FIG. 9, the virtual reality system 104 can display graphical representation settings 906 for the first social relationship type 902. Indeed, as shown in FIG. 9, the virtual reality system 104 can enable a user to set and/or disable various graphical representation settings in the graphical representation settings 906 (e.g., enable graphical representation types and/or set a level of graphical detail on a slider). Furthermore, as shown in FIG. 9, the virtual reality system 104 can also display communication settings 908 for the first social relationship type 902. As illustrated in FIG. 9, the virtual reality system 104 can enable a user to set and/or disable various communication capabilities in the communication settings 908 (e.g. enable various types of communication).

Moreover, the virtual reality system 104 can display such preferences for any number of social relationship types. For example, as shown in FIG. 9, the virtual reality system 104 can display settings for the second social relationship type 910. Indeed, as shown in FIG. 9 and as described above, the virtual reality system 104 can display example users 912, graphical representation settings 914, and communication settings 916 for the second social relationship type 910. Indeed, the virtual reality system 104 can display and enable a VR user to set and/or configure settings for any number of social relationship types in accordance with one or more embodiments herein. Furthermore, the virtual reality system 104 can display and enable a VR user to set and/or configure settings corresponding to other information from the social graph information (e.g., a range of social relevance scores). Although FIG. 9 illustrates settings for a graphical representation type and communication capabilities, the virtual reality system 104 can provide a user interface that enables a VR user to set and/or configure preferences/settings for a variety of properties and/or capabilities corresponding to one or more co-users based on social graph information.

Additionally, the virtual reality system 104 can display a user interface for and/or enable a VR user to set and/or configure preferences corresponding to any number of factors (e.g., in addition to social relevancy). For example, the virtual reality system 104 can provide a separate set of preferences that correspond to VR environment factors and/or circumstances such as, but not limited to, venue types, VR environment population size, room proximity, momentary social engagements within the VR environment, event types, and/or activity types. Indeed, the virtual reality system 104 can display a user interface for and/or enable a VR user to set and/or configure preferences for graphical representation settings and/or communication settings for any number of VR environment factors and/or circumstances. Additionally, the virtual reality system 104 can display a user interface for and/or enable a VR user to set and/or configure various thresholds (e.g., a threshold number of social connections, threshold number of interactions, threshold social relevance scores, threshold affinity coefficient values, threshold limit of co-users per graphical representation type, etc.) in accordance with one or more embodiments herein.

Moreover, in some embodiments, the virtual reality system 104 utilizes graphical representation types, communication capabilities, and/or other properties of co-users based on restrictions set by the VR environment factors and/or circumstances (e.g., the virtual reality system 104 can describe and/or display such restrictions to a VR user within the VR environment). In addition, the virtual reality system 104 can utilize graphical representation types, communication capabilities, and/or other properties of co-users based on varying roles of co-users within a VR environment (e.g., the virtual reality system 104 can render a co-user using a first graphical representation type while the co-user is an audience member and render the co-user using a second graphical representation type when the co-user is a designated speaker).

Furthermore, the virtual reality system 104 can display a user interface for and/or enable a VR user to set and/or configure preferences corresponding to how the VR user is displayed within a VR environment from the perspective of co-users. For example, the virtual reality system 104 can enable a VR user to set and/or configure graphical representation types a co-user views when viewing the VR user in a VR environment based on a social relevancy between the co-user and the VR user (e.g., in accordance with one or more embodiments herein). Moreover, the virtual reality system 104 can also enable a VR user to set and/or configure communication capabilities (e.g., how a co-user listens to and/or receives messages from the VR user) based on a social relevancy between the co-user and the VR user (e.g., in accordance with one or more embodiments herein). Additionally, the virtual reality system 104 can enable a VR user to enter a VR environment in incognito mode (e.g., using a graphical representation type corresponding to a dot and/or to not being displayed).

As mentioned above, the virtual reality system 104 can determine spatial and/or positional properties of a co-user within a VR environment based on social graph information. In particular, the virtual reality system 104 can render a VR environment for a VR user such that an optimal vantage point and/or position is maintained for the VR user. Indeed, the virtual reality system 104 can maintain an optimal vantage point and/or position for the VR user within the VR environment while also maintaining spatial and/or positional properties of one or more co-users with respect to the VR user (e.g., to maintain a co-user's physical gestures, speaking direction, etc.). For example, FIGS. 10A-10F illustrate various examples of the virtual reality system 104 determining spatial and/or positional properties of a co-user within a VR environment based on social graph information.

Figure 10B:
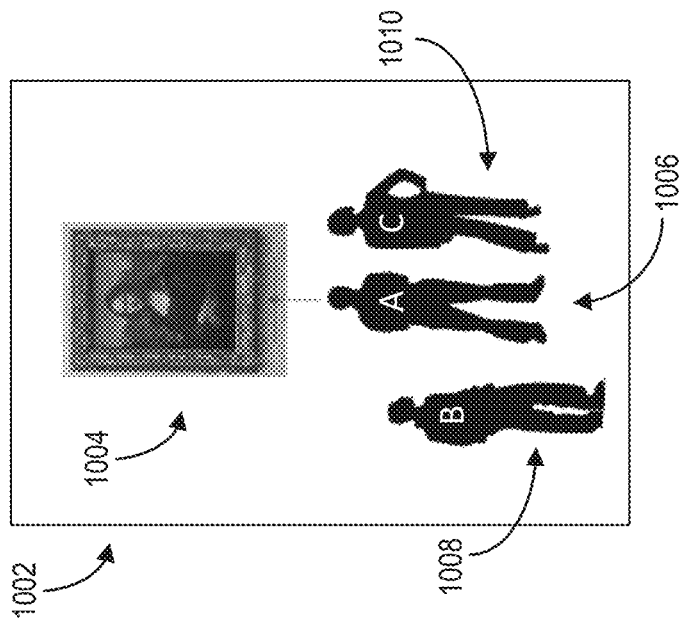
FIGS. 10A-10F illustrate a virtual reality system determining positional properties for one or more co-users in accordance with one or more embodiments.
Figure 10A:
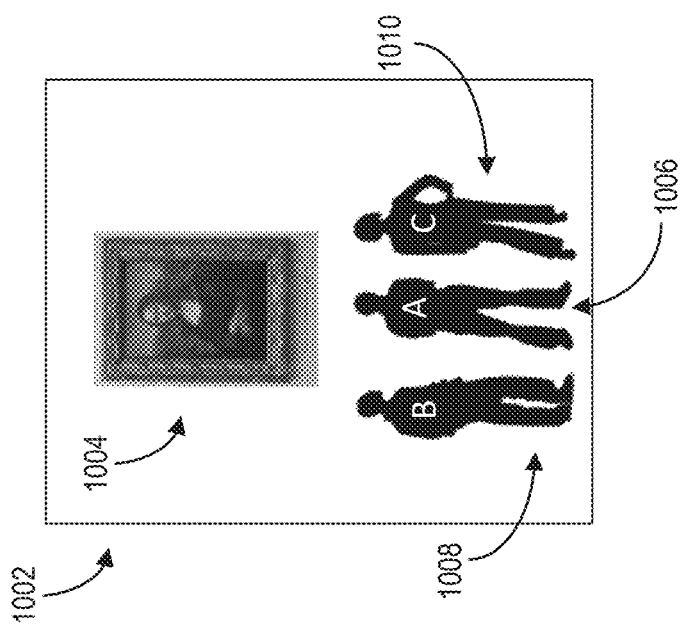

For instance, FIG. 10A illustrates a VR environment 1002 (e.g., a VR based art exhibit) that is rendered in relation to a VR user 1006 (e.g., user A). Indeed, as shown in FIG. 10A, the virtual reality system 104 can position the VR user 1006 in an optimal vantage point and/or position (e.g., seat quality, position relative to content, etc.) with respect to a point of interest 1004 (e.g., a painting within the VR environment 1002). Furthermore, as shown in FIG. 10A, the virtual reality system 104 can identify and/or determine social relationship types, graphical representation types, and/or other properties to render the co-users 1008 and 1010 in accordance with one or more embodiments herein. As an example, as shown in FIG. 10A, the virtual reality system 104 determines that co-users 1008 and 1010 (e.g., users B and C) belong to a first social relationship type (e.g., a close friend type) and display the co-users 1008 and 1010 using a first graphical representation type (e.g., a high-resolution avatar) within the VR environment 1002 for the VR user 1006.

Furthermore, the virtual reality system 104 can position co-users within a VR environment based on social graph information. As an example, as shown in FIG. 10B, the virtual reality system 104 can determine a lower social relevancy score (and/or type) for the co-user 1008 compared to the co-user 1010 with respect to the VR user 1006 (e.g., in accordance with one or more embodiments herein). Indeed, as illustrated in FIG. 10B, the virtual reality system 104 can position co-user 1008 further away from the VR user 1006 based on the determined social relevancy in comparison to the positioning of the co-user 1010 within the VR environment 1002 for the VR user 1006.

For example, the virtual reality system 104 can associate radial ranges with one or more social relationship types (and/or other social graph information as described above). In particular, the virtual reality system 104 can associate distance based radial ranges from a VR user that correspond to specific social relationship types. For example, the virtual reality system 104 can associate a first radial range to a first social relationship type, a second radial range to a second social relationship type, and so forth (e.g., in accordance with one or more embodiments herein). Indeed, the virtual reality system 104 can associate a radial range that enables a co-user to be positioned closer to a VR user based on having a higher social relationship type (e.g., a close-friend type is positioned closer to the VR user compared to a stranger type). The virtual reality system 104 can utilize any social graph information and/or any approached described in one or more embodiments above to associate and/or determine positional ranges for a co-user based on social graph information.

Furthermore, as previously mentioned, the virtual reality system 104 can maintain an optimal vantage point and/or position for any VR user within the VR environment while also maintaining spatial and/or positional properties of one or more co-users with respect to the specific VR user (e.g., to maintain a co-user's physical gestures, speaking direction, etc.). For example, FIG. 10C illustrates the virtual reality system 104 maintaining spatial and/or positional properties of co-users with respect to a specific VR user while providing an optimal vantage point for the specific VR user in a VR environment. In particular, as shown in FIG. 10C, the virtual reality system 104 can modify the position of co-user 1010 (e.g., user C), that was present in the VR environment of VR user 1006, within a VR environment 1012 that belongs to co-user 1010. Indeed, as shown in FIG. 10C, the virtual reality system 104 can position co-user 1010 in an optimal vantage point and/or position with respect to the point of interest 1004 within the VR environment 1012. Moreover, as shown in FIG. 10C, the virtual reality system 104 can also position the VR user 1006 and the co-user 1008 with respect to co-user 1010 within the VR environment 1012 of the co-user 1010 (e.g., such that physical gestures and/or speaking directions are maintained across each individual VR environment perspective).

Figure 10D:
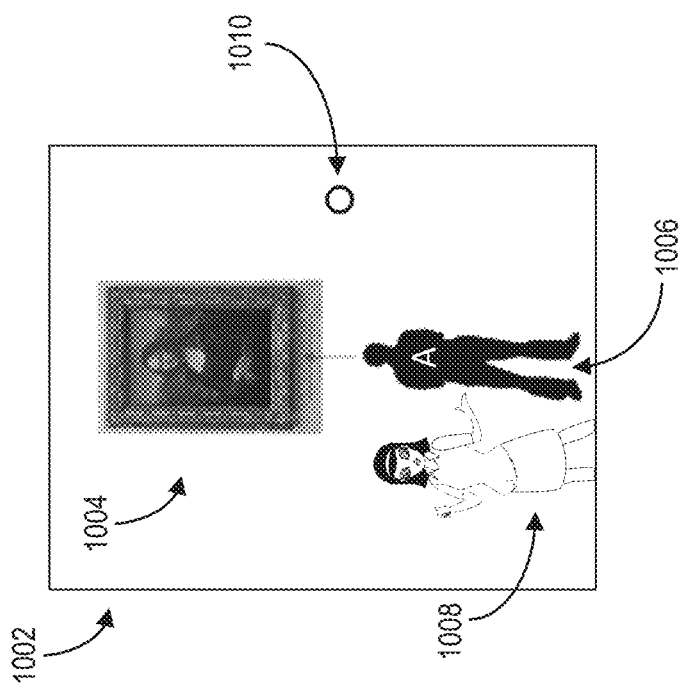
Figure 10C:
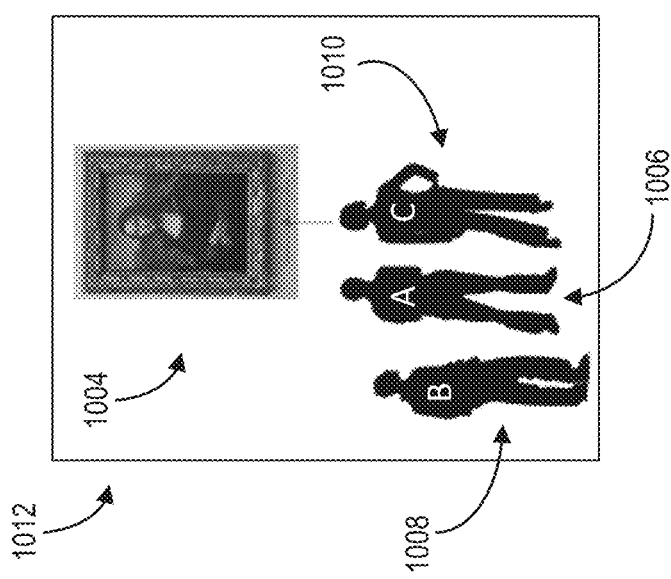

Moreover, as shown in FIG. 10D, the virtual reality system 104 can render (e.g., for the perspective of the VR user 1006 within the VR environment 1002) co-users 1008 and 1010 using various graphical representation types based on social graph information in accordance with one or more embodiments herein. Indeed, FIG. 10D illustrates the virtual reality system 104 rendering the co-user 1008 using a first graphical representation type (e.g., a standard avatar) based on having a first social relationship type with the VR user 1006 in accordance with one or more embodiments herein. Furthermore, as shown in FIG. 10D, the virtual reality system 104 can render the co-user 1010 using a second graphical representation type (e.g., a dot) based on having a second social relationship type with the VR user 1006 in accordance with one or more embodiments herein.

Figure 10F:
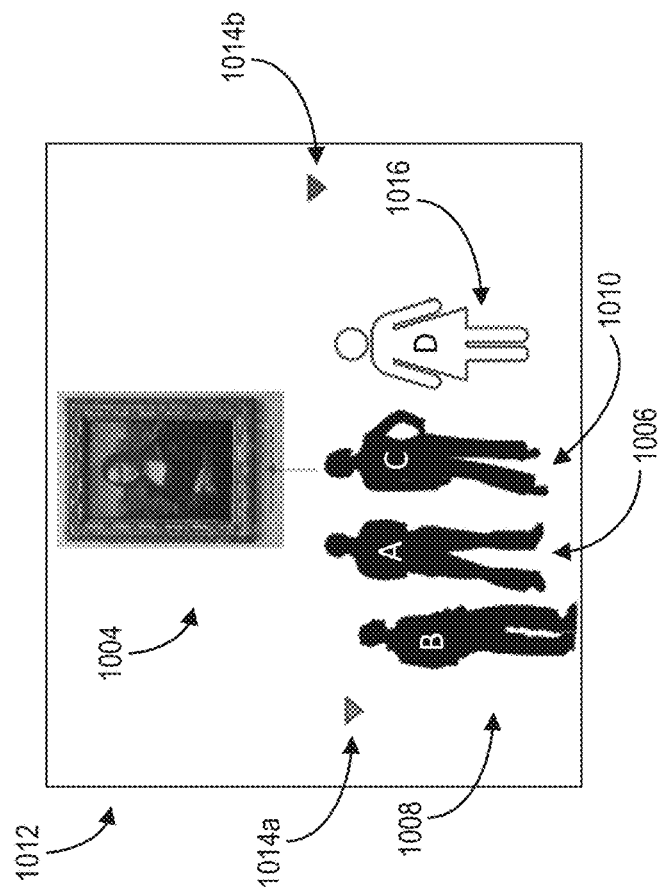
Figure 10E:
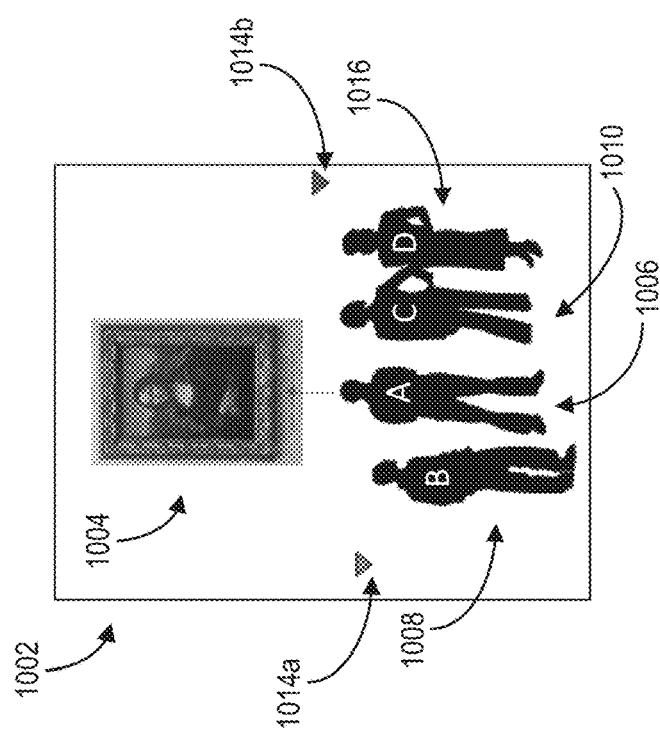

Furthermore, FIG. 10E illustrates one or more other co-users entering the VR environment 1002 of the VR user 1006. For example, in relation to FIG. 10E, the virtual reality system 104 can determine a social relationship type and/or a graphical representation type for a co-user 1016 (e.g., user D) when the co-user 1016 enters and/or prior to entering the VR environment 1002. Then, as shown in FIG. 10E, the virtual reality system 104 can render the co-user 1016 using the determined graphical representation type (e.g., a first graphical representation type corresponding to a high-resolution avatar based on a first social relationship type corresponding to a close friend type). Moreover, as shown in FIG. 10E, the virtual reality system 104 can render co-users 1014a and 1014b using another graphical representation type (e.g., corresponding to a dot) based on the co-users 1014a and 1014b having another social relationship type (e.g., a stranger type) with respect to the VR user 1006 in accordance with one or more embodiments herein. Indeed, as shown in FIG. 10E, the virtual reality system 104 can also position the co-users 1014a and 1014b in a periphery area of the VR user 1006 based on their social relationship type (e.g., such that the co-users 1014a and 1014b are not obstructive).

Furthermore, the virtual reality system 104 can also render co-users present within a VR environment differently for other users. In particular, as shown in FIG. 10F, the virtual reality system 104 can render co-users using graphical representation types based on a social relevancy of those co-users with respect to co-user 1010 (e.g., that was present in the VR environment of VR user 1006) within the VR environment 1012 that belongs to co-user 1010. Indeed, as shown in FIG. 10F, the virtual reality system 104 can determine a social relationship type between co-user 1016 and co-user 1010 to determine a graphical representation type for the co-user 1016 from the perspective of the co-user 1010 within the VR environment 1012 in accordance with one or more embodiments herein). Indeed, as shown in FIG. 10F, the virtual reality system 104 can display co-user 1016 using a different graphical representation type (e.g., an indistinct avatar) within the VR environment 1012 of the co-user 1010 compared to the graphical representation type of the co-user 1016 within the VR environment 1002 of the VR user 1006. Moreover, as shown in FIG. 10F, the virtual reality system 104 can also determine graphical representation types for the co-users 1008, 1014a, and 1014b and VR user 1006 (e.g., which is a co-user from the perspective of co-user 1010) within the VR environment 1012 of the co-user 1010 based on social graph information in accordance with one or more embodiments herein.

Figure 11A:
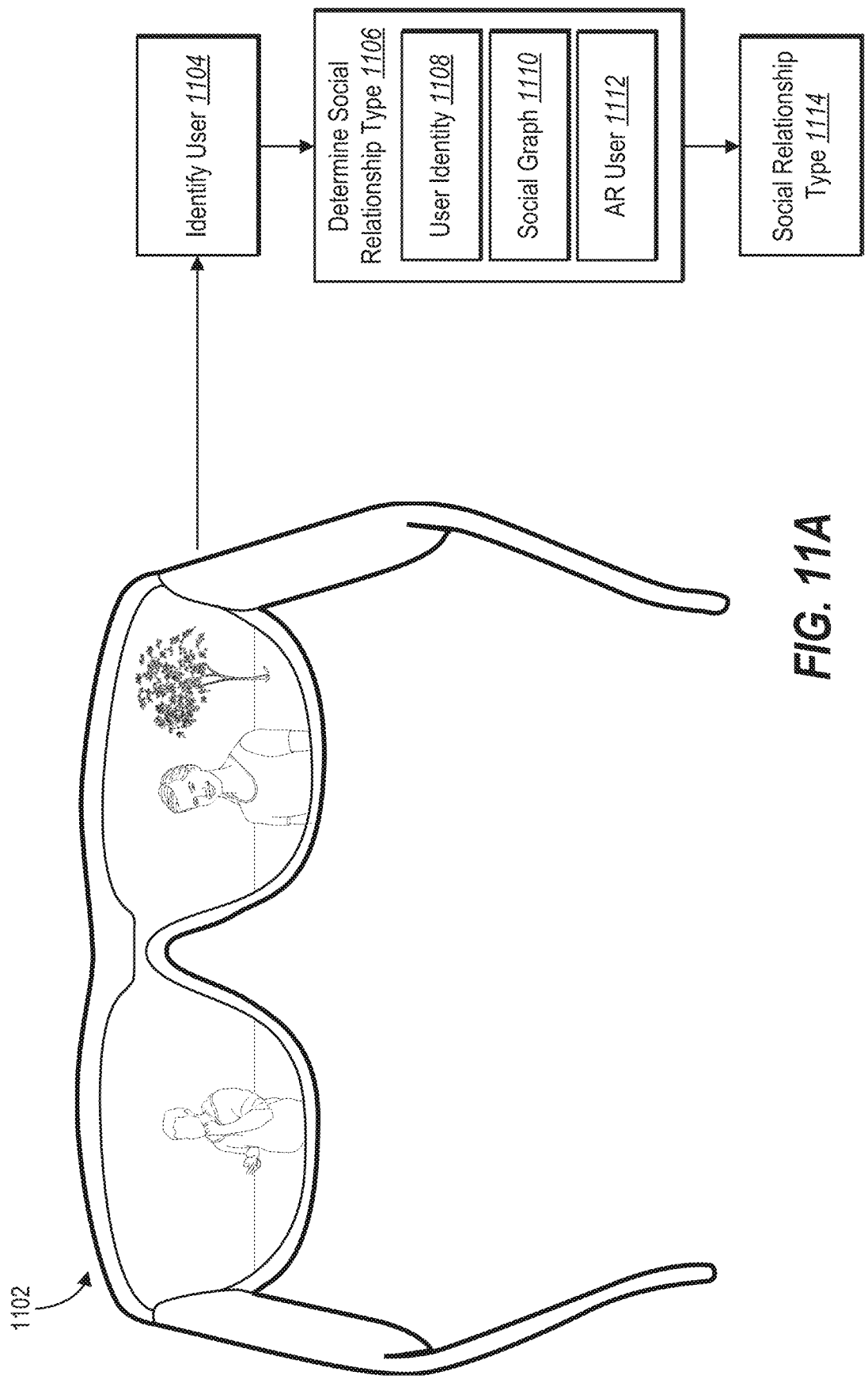

Furthermore, the virtual reality system 104 can also determine and/or render AR elements for one or more persons based on social graph information between the persons and a user wearing an HMD having AR capabilities. For example, FIGS. 11A-11C demonstrate the virtual reality system 104 determining and/or rendering AR elements for one or more co-users based on social graph information. For instance, as shown in FIG. 11A, the virtual reality system 104 can identify one or more co-users in an act 1104 within a field of view of an HMD 1102 with AR capabilities (e.g., identify the one or more persons using cameras of the HMD 1102). For instance, the virtual reality system 104 can utilize any variety of facial recognition technologies to identify users in the act 1104 (from the persons within the field of view of the HMD 1102). Then, the virtual reality system 104 can determine a social relationship type in an act 1106 based on the user identity 1108 of the one or more persons, social graph 1110, and the AR user 1112 (e.g., the user wearing the HMD 1102) for each person, in accordance with one or more embodiments herein, to receive a social relationship type 1114 for each person within the field of view of the HMD 1102.

Furthermore, the virtual reality system 104 can determine information types that correspond to the one or more social relationship types determined for the persons within the field of view of the HMD 1102. For example, as shown in FIG. 11B, the virtual reality system 104 can utilize an information type selection table 1115 to select an information type for each person within the field of view of the HMD 1102 (e.g., from FIG. 11A). Indeed, as shown in FIG. 11B, the virtual reality system 104 can utilize a first social relationship type (e.g., a type 2 social relationship type corresponding to a casual friend type) determined for the first person to select the first information type 1116 (e.g., information such as personal information, mutual friends, and occupation). Also, as illustrated in FIG. 11B the virtual reality system 104 can utilize a second social relationship type (e.g., a type 5 social relationship type corresponding to a stranger type) determined for the second person to select the second information type 1118 (e.g., information such as name and relation). Indeed, the virtual reality system 104 can determine information types and/or AR elements for a person being viewed by an AR user based on determining a social relevancy between the person and the AR user in accordance with one or more embodiments herein.

Figure 11C:
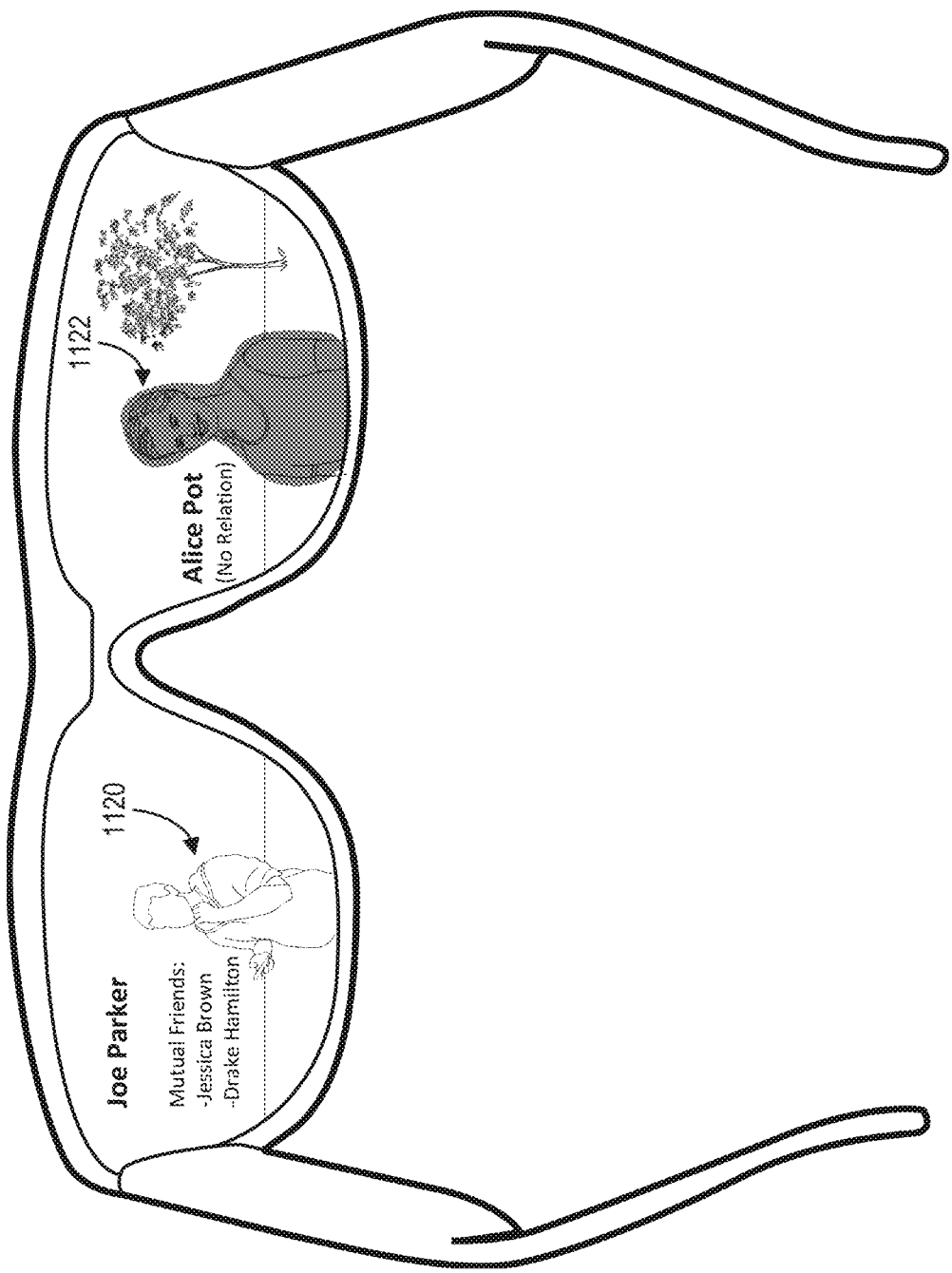

Additionally, the virtual reality system 104 can utilize determined information types for persons viewed within an AR enabled HMD based on social graph information to render AR elements for those persons. For example, FIG. 11C illustrates the virtual reality system 104 utilizing the determined information types (e.g., from FIG. 11B) to render AR elements for the persons within the field of view of the HMD 1102. For instance, based on selecting the first information type 1116 for the first person (e.g., person 1120), the virtual reality system 104 displays AR elements for a name and mutual friends of the person 1120 in association to the person 1120 within the AR user's field of view in the HMD 1102. Moreover, based on selecting the second information type 1118 for the second person (e.g., person 1122), the virtual reality system 104 displays AR elements for a name and relationship type of the person 1122 in association to the person 1122 and within the AR user's field of view in the HMD 1102.

Additionally, the virtual reality system 104 can enable a user to set and/or configure types of information that are displayed as AR elements for the AR user (e.g., to other persons viewing the AR user via a separate HMD) based on social relevancies. For example, the virtual reality system 104 can enable a user to set and/or configure an association between a first set of information types and a first social relationship type and an association between a second set of information types and a second social relationship type in accordance with one or more embodiments. Then, the virtual reality system 104 can display the type of information that corresponds to the social relationship type that is determined between the AR user and another person that is viewing the AR user via a separate HMD in accordance with one or more embodiments herein.

Indeed, the virtual reality system 104 can render AR elements for any variety of information corresponding to a person based on a social relevancy between a person being viewed and an AR user in accordance with one or more embodiments herein. Furthermore, the virtual reality system 104 can determine and/or render AR elements for any number of persons based on social graph information between the persons and a user wearing an HMD having AR capabilities in accordance with one or more embodiments herein. Furthermore, the virtual reality system 104 can render AR elements that include text information (e.g., pronoun preferences, residential information, dietary preferences, allergies, etc.), color, highlights, mood information, event information from social graph information, and/or any combination thereof for a person being viewed within a HMD enabled for AR in accordance with one or more embodiments herein.

Figure 12:
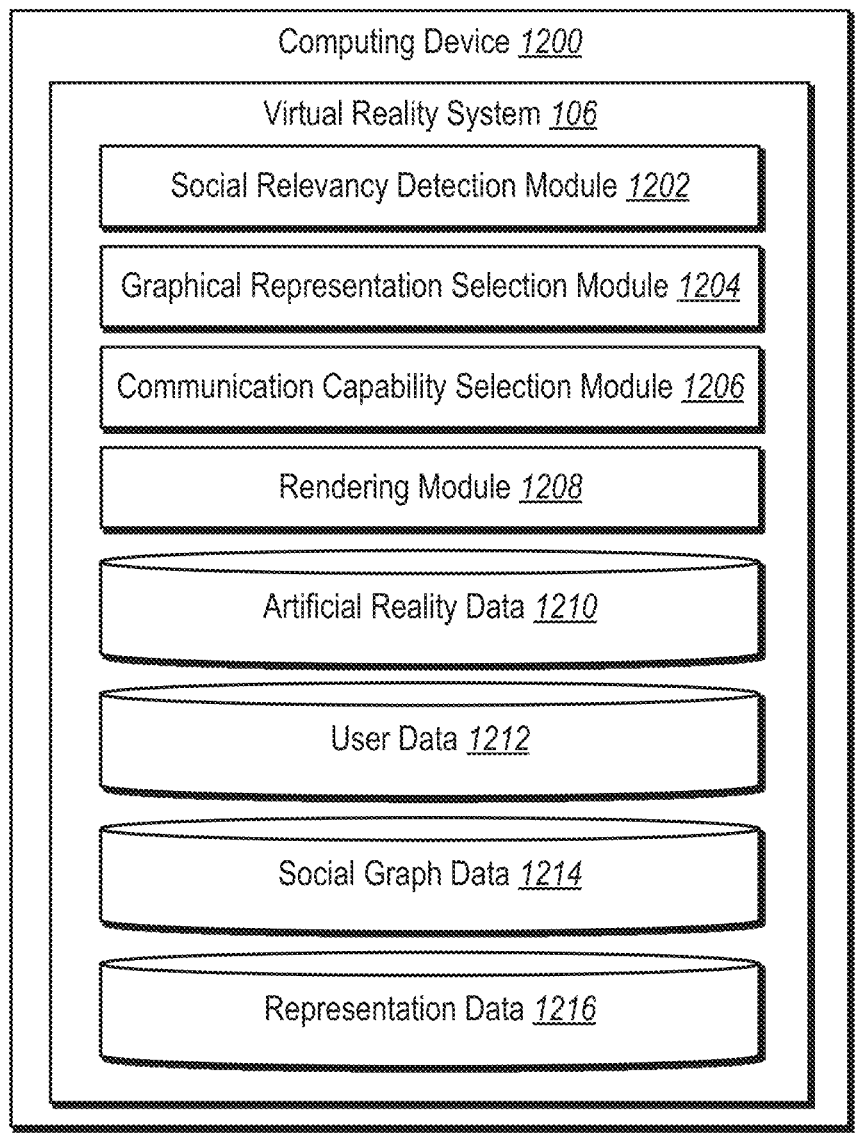
FIG. 12 illustrates a schematic diagram of a virtual reality system in accordance with one or more embodiments.

Turning now to FIG. 12, additional detail will be provided regarding components and capabilities of one embodiment of a virtual reality system. In particular, FIG. 12 illustrates an embodiment of an example virtual reality system 104 executed by a computing device 1200 (e.g., the server device(s) 102, the head mounted display device 108, and/or another head mounted display). As shown by the embodiment in FIG. 12, the computing device 1200 can include and/or host the virtual reality system 104. Furthermore, as shown in FIG. 12, the virtual reality system 104 can include a social relevancy detection module 1202, a graphical representation selection module 1204, a communication capability selection module 1206, and a rendering module 1208. Moreover, as illustrated in FIG. 12, the virtual reality system 104 can include storage modules for artificial reality data 1210, user data 1212, social graph data 1214, and representation data 1216.

As mentioned above, and as illustrated in the embodiment of FIG. 12, the virtual reality system 104 can include the social relevancy detection module 1202. For example, the social relevancy detection module can identify users, identify and/or determine social relevancies from social graph information, identify and/or determine social relationship types, social relevance scores and/or other information based of social graph information between users as described above (e.g., in relation to FIGS. 3 and 11A-11C).

Furthermore, as shown in FIG. 12, the virtual reality system 104 can also include the graphical representation selection module 1204. For instance, the graphical representation selection module 1204 can determine and/or select graphical representation types, levels of graphical detail, and/or other properties for users within VR environments based on social graph information as described above (e.g., in relation to FIGS. 4, 5, and 11A-11C). Additionally, the graphical representation selection module 1204 can utilize user preferences, VR environment factors and/or circumstances, and/or other settings to determine and/or select graphical representation types, levels of graphical detail, and/or other properties for users within VR environments based on social graph information as described above (e.g., in relation to FIGS. 4, 5, 6, 8, 9, and 11A-11C).

Moreover, as illustrated in FIG. 12, the virtual reality system 104 can also include the communication capability selection module 1206. For example, the communication capability selection module 1206 can determine and/or select communication capabilities, interaction capabilities, positional properties, and/or other properties for users within VR environments based on social graph information as described above (e.g., in relation to FIGS. 7, 8, 9, 10A-10F, and 11A-11C). Additionally, the communication capability selection module 1206 can utilize user preferences, VR environment factors and/or circumstances, and/or other settings to determine and/or select communication capabilities, interaction capabilities, positional properties, and/or other properties for users within VR environments based on social graph information as described above (e.g., in relation to FIGS. 4, 5, 6, 8, 9, 10A-10F, and 11A-11C).

Furthermore, as shown in FIG. 12, the virtual reality system 104 can also include the rendering module 1208. For instance, the rendering module 1208 can utilize one or more graphical representation types, levels of graphical details, and/or other properties to display co-users and/or other objects within a VR environment as described above (e.g., in relation to FIGS. 6, 8, 9, 10A-10F, and 11A-11C). Additionally, the rendering module 1208 can also display one or more user interfaces to set and/or configure preferences corresponding to graphical representation types, levels of graphical details, communication capabilities, and/or other properties as described above (e.g., in relation to FIGS. 6, 8, 9, 10A-10F, and 11A-11C).

Moreover, as illustrated in FIG. 12, the virtual reality system 104 can include one or more storage modules. In particular, the one or more storage modules can maintain data to perform the one or more functions of the virtual reality system 104. As shown in FIG. 12, the virtual reality system 104 can include a storage module for artificial reality data 1210 (e.g., virtual reality elements, augmented reality elements, mixed reality elements, graphics-based data such as visual content). Furthermore, as shown in FIG. 12, the virtual reality system 104 can include a storage module for user data 1212 (e.g., virtual user identities, user preferences, personal information, social relationship types, graphical representation types). Additionally, as illustrated in FIG. 12, the virtual reality system 104 can include social graph data 1214 (e.g., social graph data as described in FIG. 16). In addition, as shown in FIG. 12, the virtual reality system 104 can include representation data 1216 (e.g., graphical representation types, communication capabilities, interaction capabilities, other assignable properties).

Figure 13:
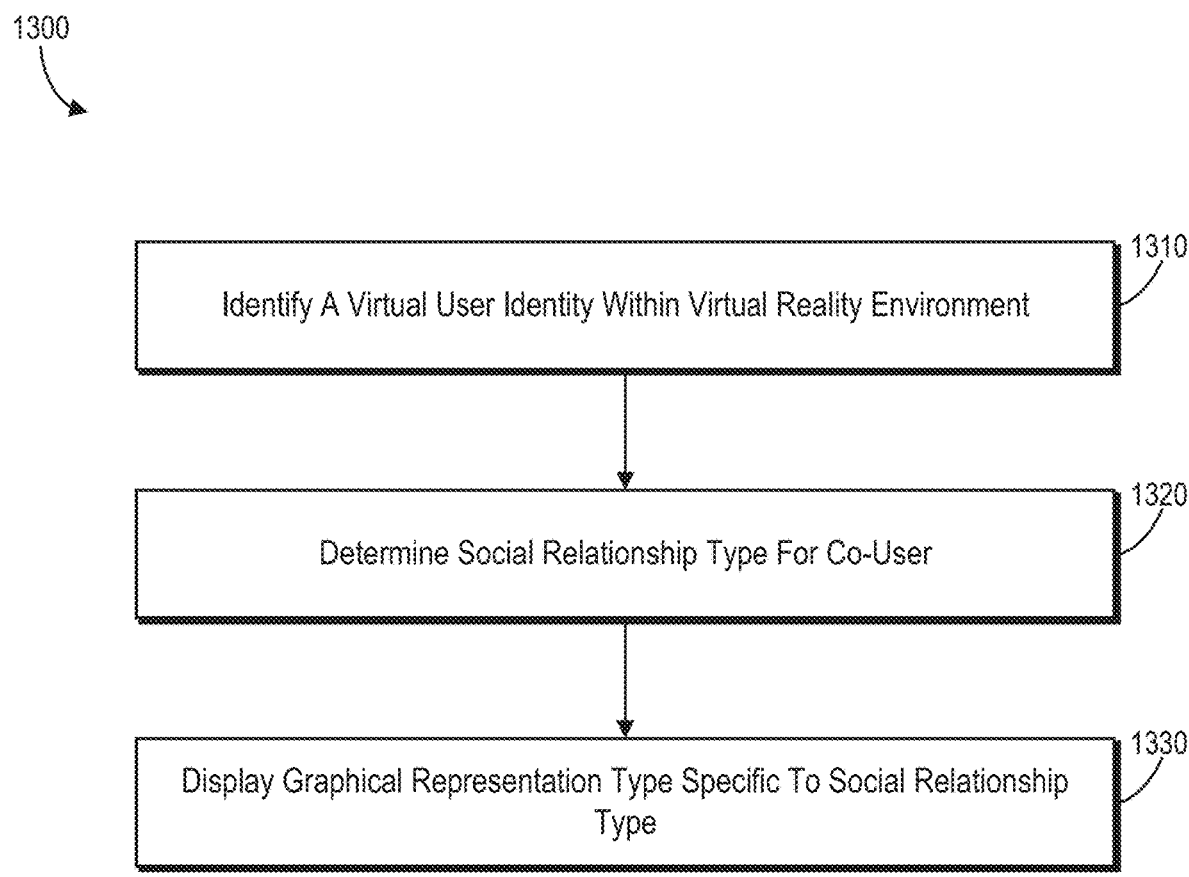
FIG. 13 illustrates a flowchart of a series of acts for variably rendering graphical representations of co-users in VR environments based on social graph information associated with the co-users and a VR user in accordance with one or more embodiments.

FIGS. 1-12, the corresponding text, and the examples provide a number of different methods, systems, devices, and non-transitory computer-readable media of the virtual reality system 104. In addition to the foregoing, one or more embodiments can also be described in terms of flowcharts comprising acts for accomplishing a particular result, as shown in FIG. 13. FIG. 13 may be performed with more or fewer acts. Further, the acts may be performed in differing orders. Additionally, the acts described herein may be repeated or performed in parallel with one another or parallel with different instances of the same or similar acts.

As mentioned, FIG. 13 illustrates a flowchart of a series of acts 1300 for variably rendering graphical representations of co-users in VR environments based on social graph information associated with the co-users and a VR user in accordance with one or more embodiments. While FIG. 13 illustrates acts according to one embodiment, alternative embodiments may omit, add to, reorder, and/or modify any of the acts shown in FIG. 13. The acts of FIG. 13 can be performed as part of a method. Alternatively, a non-transitory computer-readable medium can comprise instructions that, when executed by one or more processors, cause a computing device to perform the acts of FIG. 13. In some embodiments, a system can perform the acts of FIG. 13.

As illustrated in FIG. 13, the series of acts 1300 includes an act 1310 of identifying a virtual user identity within a virtual reality environment. In particular, the act 1310 can include identifying a virtual user identity within a virtual reality environment displayed by a head mounted display associated with a user. For instance, a virtual user identity can be associated with a co-user of a communications system. Furthermore, the act 1310 can also include identifying a co-user within a virtual reality environment in a head mounted display of a user. Moreover, the act 1310 can also include identifying a second virtual user identity within a virtual reality environment. For example, a second virtual user identity can be associated with a second co-user of a communications system.

As illustrated in FIG. 13, the series of acts 1300 includes an act 1320 of determining a social relationship type for a co-user. In particular, the act 1320 can include determining a social relationship type for a co-user based on social graph information associated with a user and the co-user. Furthermore, the act 1320 can include determining a social relationship type for a co-user by determining a number of social connections between a user and the co-user from social graph information. For example, a social relationship type can include at least one of a family member type, a close friend type, a casual friend type, an acquaintance type, a stranger type, and/or a restricted type. Moreover, the act 1320 can include determining a social relationship type for a second co-user based on social graph information associated with a user and the second co-user. For instance, a social relationship type for a co-user can be different than a social relationship type for a second co-user. Additionally, the act 1320 can include determining a social relationship type for a second co-user based on social graph information associated with a user, a co-user, and a second co-user.

As illustrated in FIG. 13, the series of acts 1300 includes an act 1330 of displaying a graphical representation type specific to a social relationship type. In particular, the act 1330 can include causing a head mounted display to display a graphical representation type specific to a social relationship type for a co-user to represent a virtual user identity associated with the co-user within a virtual reality environment. For example, a graphical representation types for a co-user can include at least one of a first graphical representation type having a first level of graphical detail and/or a second graphical representation type having a second level of graphical detail. For instance, a second level of graphical detail can be different than a first level of graphical detail.

Additionally, the act 1330 can include causing a head mounted display a second graphical representation type specific to a social relationship type for a second co-user to represent a second virtual user identity within a virtual reality environment. Moreover, the act 1330 can also include causing a head mounted display to display a graphical representation type specific to a social relationship type for a co-user by causing the head mounted display to display a digital avatar to represent the virtual user identity associated with the co-user within a virtual reality environment. Furthermore, the act 1330 can include causing a head mounted display to display a second graphical representation type specific to a social relationship type for a second co-user by causing the head mounted display to display a digital dot to represent a second virtual user identity associated with a second co-user within a virtual reality environment. Moreover, the act 1330 can include receiving, from a user, graphical representation preference information. For instance, graphical representation preference information can associate one or more social relationship types with one or more graphical representation types.

Furthermore, the act 1330 can include providing a digital communication capability to a co-user within a virtual reality environment based on a social relationship type for the co-user. For instance, the digital communication capability can include at least one of a symbol-based communication capability, a color-based communication capability, a movement-based communication capability, an emote-based communication capability, a sound effect-based communication capability, or a voice-based communication capability.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
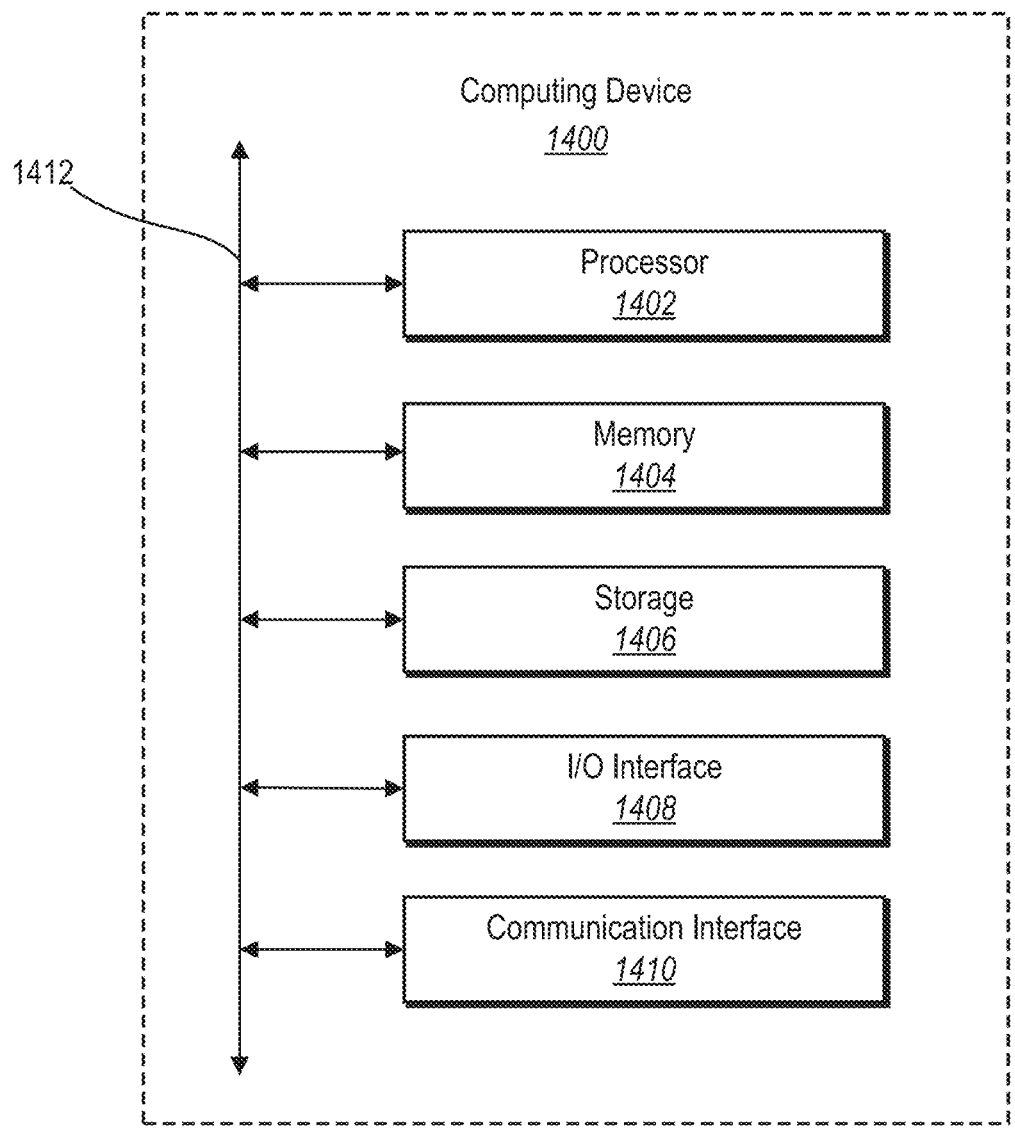
FIG. 14 illustrates a block diagram of an example computing device in accordance with one or more embodiments.

FIG. 14 illustrates a block diagram of an example computing device 1400 that may be configured to perform one or more of the processes described above. One will appreciate that one or more computing devices, such as the computing device 1400 may represent the computing devices described above (e.g., server device(s) 102, head mounted display device 108, and/or a mobile processing device). In one or more embodiments, the computing device 1400 may be a mobile device (e.g., a mobile telephone, a smartphone, a PDA, a tablet, a laptop, a camera, a tracker, a watch, a wearable device, a head mounted display, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other. As an example, the bus 1412 may include one or more types of buses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g. wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 15:
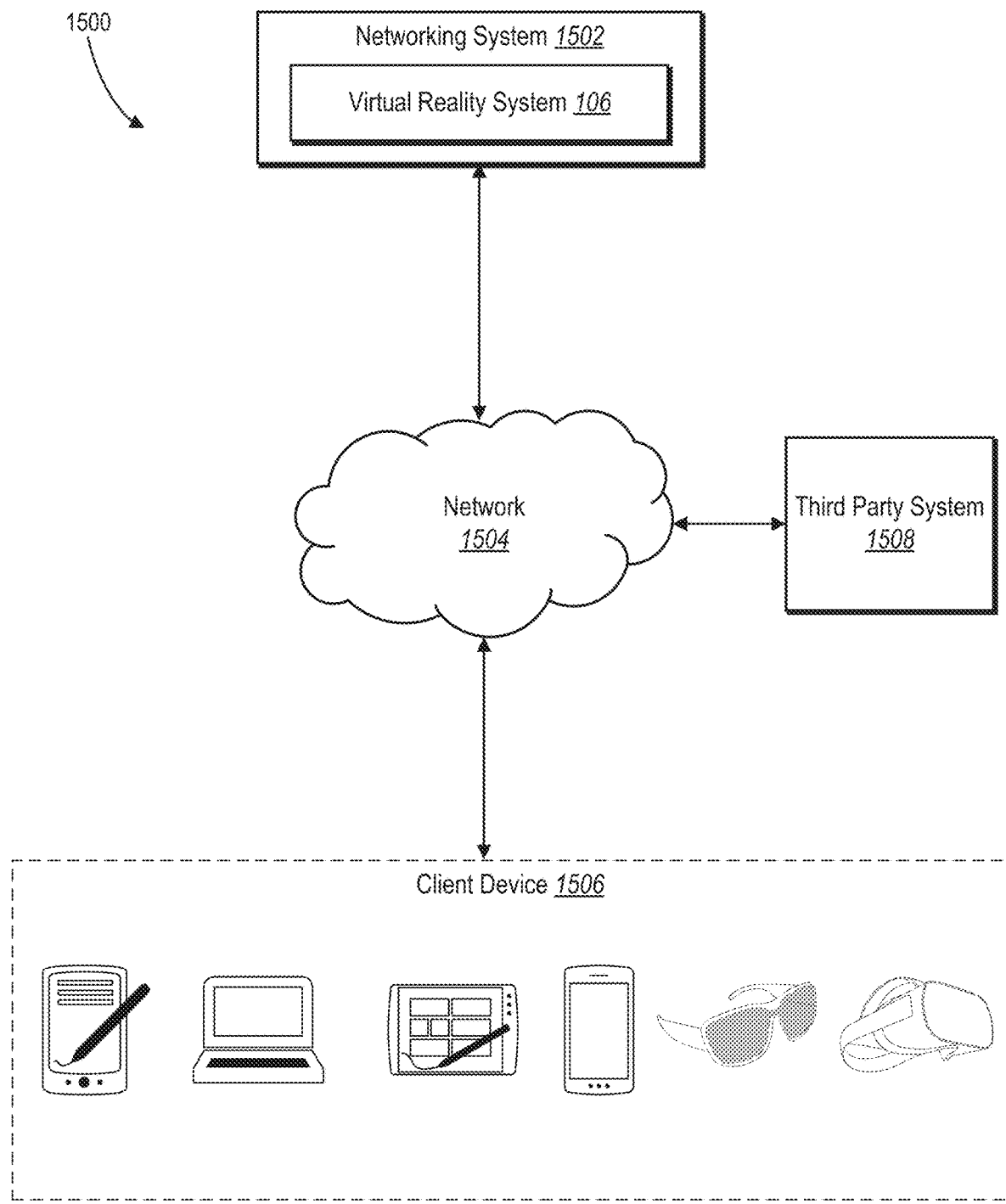
FIG. 15 illustrates an example environment of a networking system having a virtual reality system in accordance with one or more embodiments.

FIG. 15 illustrates an example network environment 1500 of a social networking system. Network environment 1500 includes a client device 1506, a networking system 1502 (e.g., a social networking system and/or an electronic messaging system), and a third-party system 1508 connected to each other by a network 1504. Although FIG. 15 illustrates a particular arrangement of client device 1506, networking system 1502, third-party system 1508, and network 1504, this disclosure contemplates any suitable arrangement of client device 1506, networking system 1502, third-party system 1508, and network 1504. As an example and not by way of limitation, two or more of client device 1506, networking system 1502, and third-party system 1508 may be connected to each other directly, bypassing network 1504. As another example, two or more of client device 1506, networking system 1502, and third-party system 1508 may be physically or logically co-located with each other in whole or in part. Moreover, although FIG. 15 illustrates a particular number of client devices 1506, networking systems 1502, third-party systems 1508, and networks 1504, this disclosure contemplates any suitable number of client devices 1506, networking systems 1502, third-party systems 1508, and networks 1504. As an example and not by way of limitation, network environment 1500 may include multiple client device 1506, networking systems 1502, third-party systems 1508, and networks 1504.

This disclosure contemplates any suitable network 1504. As an example and not by way of limitation, one or more portions of network 1504 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1504 may include one or more networks 1504.

Links may connect client device 1506, networking system 1502, and third-party system 1508 to communication network 1504 or to each other. This disclosure contemplates any suitable links. In particular embodiments, one or more links include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1500. One or more first links may differ in one or more respects from one or more second links.

In particular embodiments, client device 1506 may be an electronic device including hardware, software, or embedded logic components or a combination of two or more such components and capable of carrying out the appropriate functionalities implemented or supported by client device 1506. As an example and not by way of limitation, a client device 1506 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1506. A client device 1506 may enable a network user at client device 1506 to access network 1504. A client device 1506 may enable its user to communicate with other users at other client devices 1506.

In particular embodiments, client device 1506 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1506 may enter a Uniform Resource Locator (URL) or other address directing the web browser to a particular server (such as server, or a server associated with a third-party system 1508), and the web browser may generate a Hyper Text Transfer Protocol (HTTP) request and communicate the HTTP request to server. The server may accept the HTTP request and communicate to client device 1506 one or more Hyper Text Markup Language (HTML) files responsive to the HTTP request. Client device 1506 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1502 may be a network-addressable computing system that can host an online social network. Networking system 1502 may generate, store, receive, and send social-networking data, such as, for example, user-profile data, concept-profile data, social-graph information, or other suitable data related to the online social network. Networking system 1502 may be accessed by the other components of network environment 1500 either directly or via network 1504. In particular embodiments, networking system 1502 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1502 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1506, a networking system 1502, or a third-party system 1508 to manage, retrieve, modify, add, or delete, the information stored in data store.

In particular embodiments, networking system 1502 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1502 may provide users of the online social network the ability to communicate and interact with other users. In particular embodiments, users may join the online social network via networking system 1502 and then add connections (e.g., relationships) to a number of other users of networking system 1502 that they want to be connected to. Herein, the term "friend" may refer to any other user of networking system 1502 with whom a user has formed a connection, association, or relationship via networking system 1502.

In particular embodiments, networking system 1502 may provide users with the ability to take actions on various types of items or objects, supported by networking system 1502. As an example and not by way of limitation, the items and objects may include groups or social networks to which users of networking system 1502 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1502 or by an external system of third-party system 1508, which is separate from networking system 1502 and coupled to networking system 1502 via a network 1504.

In particular embodiments, networking system 1502 may be capable of linking a variety of entities. As an example and not by way of limitation, networking system 1502 may enable users to interact with each other as well as receive content from third-party systems 1508 or other entities, or to allow users to interact with these entities through an application programming interfaces (API) or other communication channels.

In particular embodiments, a third-party system 1508 may include one or more types of servers, one or more data stores, one or more interfaces, including but not limited to APIs, one or more web services, one or more content sources, one or more networks, or any other suitable components, e.g., that servers may communicate with. A third-party system 1508 may be operated by a different entity from an entity operating networking system 1502. In particular embodiments, however, networking system 1502 and third-party systems 1508 may operate in conjunction with each other to provide social-networking services to users of networking system 1502 or third-party systems 1508. In this sense, networking system 1502 may provide a platform, or backbone, which other systems, such as third-party systems 1508, may use to provide social-networking services and functionality to users across the Internet.

In particular embodiments, a third-party system 1508 may include a third-party content object provider. A third-party content object provider may include one or more sources of content objects, which may be communicated to a client device 1506. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1502 also includes user-generated content objects, which may enhance a user's interactions with networking system 1502. User-generated content may include anything a user can add, upload, send, or "post" to networking system 1502. As an example and not by way of limitation, a user communicates posts to networking system 1502 from a client device 1506. Posts may include data such as status updates or other textual data, location information, photos, videos, links, music or other similar data or media. Content may also be added to networking system 1502 by a third-party through a "communication channel," such as a newsfeed or stream.

In particular embodiments, networking system 1502 may include a variety of servers, sub-systems, programs, modules, logs, and data stores. In particular embodiments, networking system 1502 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1502 may also include suitable components such as network interfaces, security mechanisms, load balancers, failover servers, management-and-network-operations consoles, other suitable components, or any suitable combination thereof. In particular embodiments, networking system 1502 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1502 to one or more client devices 1506 or one or more third-party system 1508 via network 1504. The web server may include a mail server or other messaging functionality for receiving and routing messages between networking system 1502 and one or more client devices 1506. An API-request server may allow a third-party system 1508 to access information from networking system 1502 by calling one or more APIs. An action logger may be used to receive communications from a web server about a user's actions on or off networking system 1502. In conjunction with the action log, a third-party-content-object log may be maintained of user exposures to third-party-content objects. A notification controller may provide information regarding content objects to a client device 1506. Information may be pushed to a client device 1506 as notifications, or information may be pulled from client device 1506 responsive to a request received from client device 1506.

Authorization servers may be used to enforce one or more privacy settings of the users of networking system 1502. A privacy setting of a user determines how particular information associated with a user can be shared. The authorization server may allow users to opt in to or opt out of having their actions logged by networking system 1502 or shared with other systems (e.g., third-party system 1508), such as, for example, by setting appropriate privacy settings. Third-party-content-object stores may be used to store content objects received from third parties, such as a third-party system 1508. Location stores may be used for storing location information received from client devices 1506 associated with users. Advertisement-pricing modules may combine social information, the current time, location information, or other suitable information to provide relevant advertisements, in the form of notifications, to a user.

FIG. 16 illustrates example social graph 1600. In particular embodiments, networking system 1502 may store one or more social graphs 1600 in one or more data stores. In particular embodiments, social graph 1600 may include multiple nodes—which may include multiple user nodes 1602 or multiple concept nodes 1604—and multiple edges 1606 connecting the nodes. Example social graph 1600 illustrated in FIG. 16 is shown, for didactic purposes, in a two-dimensional visual map representation. In particular embodiments, a networking system 1502, client device 1506, or third-party system 1508 may access social graph 1600 and related social-graph information for suitable applications. The nodes and edges of social graph 1600 may be stored as data objects, for example, in a data store (such as a social-graph database). Such a data store may include one or more searchable or query able indexes of nodes or edges of social graph 1600.

In particular embodiments, a user node 1602 may correspond to a user of networking system 1502. As an example and not by way of limitation, a user may be an individual (human user), an entity (e.g., an enterprise, business, or third-party application), or a group (e.g., of individuals or entities) that interacts or communicates with or over networking system 1502. In particular embodiments, when a user registers for an account with networking system 1502, networking system 1502 may create a user node 1602 corresponding to the user, and store the user node 1602 in one or more data stores. Users and user nodes 1602 described herein may, where appropriate, refer to registered users and user nodes 1602 associated with registered users. In addition or as an alternative, users and user nodes 1602 described herein may, where appropriate, refer to users that have not registered with networking system 1502. In particular embodiments, a user node 1602 may be associated with information provided by a user or information gathered by various systems, including networking system 1502. As an example and not by way of limitation, a user may provide his or her name, profile picture, contact information, birth date, sex, marital status, family status, employment, education background, preferences, interests, or other demographic information. In particular embodiments, a user node 1602 may be associated with one or more data objects corresponding to information associated with a user. In particular embodiments, a user node 1602 may correspond to one or more webpages.

In particular embodiments, a concept node 1604 may correspond to a concept. As an example and not by way of limitation, a concept may correspond to a place (such as, for example, a movie theater, restaurant, landmark, or city); a website (such as, for example, a website associated with networking system 1502 or a third-party website associated with a web-application server); an entity (such as, for example, a person, business, group, sports team, or celebrity); a resource (such as, for example, an audio file, video file, digital photo, text file, structured document, or application) which may be located within networking system 1502 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1604 may be associated with information of a concept provided by a user or information gathered by various systems, including networking system 1502. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1604 may be associated with one or more data objects corresponding to information associated with concept node 1604. In particular embodiments, a concept node 1604 may correspond to one or more webpages.

In particular embodiments, a node in social graph 1600 may represent or be represented by a webpage (which may be referred to as a "profile page"). Profile pages may be hosted by or accessible to networking system 1502. Profile pages may also be hosted on third-party websites associated with a third-party system 1508. As an example and not by way of limitation, a profile page corresponding to a particular external webpage may be the particular external webpage and the profile page may correspond to a particular concept node 1604. Profile pages may be viewable by all or a selected subset of other users. As an example and not by way of limitation, a user node 1602 may have a corresponding user-profile page in which the corresponding user may add content, make declarations, or otherwise express himself or herself. As another example and not by way of limitation, a concept node 1604 may have a corresponding concept-profile page in which one or more users may add content, make declarations, or express themselves, particularly in relation to the concept corresponding to concept node 1604.

In particular embodiments, a concept node 1604 may represent a third-party webpage or resource hosted by a third-party system 1508. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1506 to send to networking system 1502 a message indicating the user's action. In response to the message, networking system 1502 may create an edge (e.g., an "eat" edge) between a user node 1602 corresponding to the user and a concept node 1604 corresponding to the third-party webpage or resource and store edge 1606 in one or more data stores.

In particular embodiments, a pair of nodes in social graph 1600 may be connected to each other by one or more edges 1606. An edge 1606 connecting a pair of nodes may represent a relationship between the pair of nodes. In particular embodiments, an edge 1606 may include or represent one or more data objects or attributes corresponding to the relationship between a pair of nodes. As an example and not by way of limitation, a first user may indicate that a second user is a "friend" of the first user. In response to this indication, networking system 1502 may send a "friend request" to the second user. If the second user confirms the "friend request," networking system 1502 may create an edge 1606 connecting the first user's user node 1602 to the second user's user node 1602 in social graph 1600 and store edge 1606 as social-graph information in one or more of data stores. In the example of FIG. 16, social graph 1600 includes an edge 1606 indicating a friend relation between user nodes 1602 of user "A" and user "B" and an edge indicating a friend relation between user nodes 1602 of user "C" and user "B." Although this disclosure describes or illustrates particular edges 1606 with particular attributes connecting particular user nodes 1602, this disclosure contemplates any suitable edges 1606 with any suitable attributes connecting user nodes 1602. As an example and not by way of limitation, an edge 1606 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1600 by one or more edges 1606.

In particular embodiments, an edge 1606 between a user node 1602 and a concept node 1604 may represent a particular action or activity performed by a user associated with user node 1602 toward a concept associated with a concept node 1604. As an example and not by way of limitation, as illustrated in FIG. 16, a user may "like," "attended," "played," "listened," "cooked," "worked at," or "watched" a concept, each of which may correspond to an edge type or subtype. A concept-profile page corresponding to a concept node 1604 may include, for example, a selectable "check in" icon (such as, for example, a clickable "check in" icon) or a selectable "add to favorites" icon. Similarly, after a user clicks these icons, networking system 1502 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1502 may create a "listened" edge 1606 and a "used" edge (as illustrated in FIG. 16) between user nodes 1602 corresponding to the user and concept nodes 1604 corresponding to the song and application to indicate that the user listened to the song and used the application. Moreover, networking system 1502 may create a "played" edge 1606 (as illustrated in FIG. 16) between concept nodes 1604 corresponding to the song and the application to indicate that the particular song was played by the particular application. In this case, "played" edge 1606 corresponds to an action performed by an external application (SPOTIFY) on an external audio file (the song "Imagine"). Although this disclosure describes particular edges 1606 with particular attributes connecting user nodes 1602 and concept nodes 1604, this disclosure contemplates any suitable edges 1606 with any suitable attributes connecting user nodes 1602 and concept nodes 1604. Moreover, although this disclosure describes edges between a user node 1602 and a concept node 1604 representing a single relationship, this disclosure contemplates edges between a user node 1602 and a concept node 1604 representing one or more relationships. As an example and not by way of limitation, an edge 1606 may represent both that a user likes and has used at a particular concept. Alternatively, another edge 1606 may represent each type of relationship (or multiples of a single relationship) between a user node 1602 and a concept node 1604 (as illustrated in FIG. 16 between user node 1602 for user "E" and concept node 1604 for "SPOTIFY").

In particular embodiments, networking system 1502 may create an edge 1606 between a user node 1602 and a concept node 1604 in social graph 1600. As an example and not by way of limitation, a user viewing a concept-profile page (such as, for example, by using a web browser or a special-purpose application hosted by the user's client device 1506) may indicate that he or she likes the concept represented by the concept node 1604 by clicking or selecting a "Like" icon, which may cause the user's client device 1506 to send to networking system 1502 a message indicating the user's liking of the concept associated with the concept-profile page. In response to the message, networking system 1502 may create an edge 1606 between user node 1602 associated with the user and concept node 1604, as illustrated by "like" edge 1606 between the user and concept node 1604. In particular embodiments, networking system 1502 may store an edge 1606 in one or more data stores. In particular embodiments, an edge 1606 may be automatically formed by networking system 1502 in response to a particular user action. As an example and not by way of limitation, if a first user uploads a picture, watches a movie, or listens to a song, an edge 1606 may be formed between user node 1602 corresponding to the first user and concept nodes 1604 corresponding to those concepts. Although this disclosure describes forming particular edges 1606 in particular manners, this disclosure contemplates forming any suitable edges 1606 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1502). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1502 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1502) or RSVP (e.g., through networking system 1502) to an event associated with the advertisement. In addition or as an alternative, an advertisement may include social-networking-system context directed to the user. As an example and not by way of limitation, an advertisement may display information about a friend of the user within networking system 1502 who has taken an action associated with the subject matter of the advertisement.

In particular embodiments, networking system 1502 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1508 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1502 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1502 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1502 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short-or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1502 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1502 may calculate a coefficient based on a user's actions. Networking system 1502 may monitor such actions on the online social network, on a third-party system 1508, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1502 may calculate a coefficient based on the user's actions with particular types of content. The content may be associated with the online social network, a third-party system 1508, or another suitable system. The content may include users, profile pages, posts, news stories, headlines, instant messages, chat room conversations, emails, advertisements, pictures, video, music, other suitable objects, or any combination thereof. Networking system 1502 may analyze a user's actions to determine whether one or more of the actions indicate an affinity for subject matter, content, other users, and so forth. As an example and not by way of limitation, if a user may make frequently posts content related to "coffee" or variants thereof, networking system 1502 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1502 may calculate a coefficient based on the type of relationship between particular objects. Referencing the social graph 1600, networking system 1502 may analyze the number and/or type of edges 1606 connecting particular user nodes 1602 and concept nodes 1604 when calculating a coefficient. As an example and not by way of limitation, user nodes 1602 that are connected by a spouse-type edge (representing that the two users are married) may be assigned a higher coefficient than a user node 1602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1502 may determine that the user has a higher coefficient with respect to the first photo than the second photo because having a tagged-in-type relationship with content may be assigned a higher weight and/or rating than having a like-type relationship with content. In particular embodiments, networking system 1502 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1502 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1600. As an example and not by way of limitation, social-graph entities that are closer in the social graph 1600 (i.e., fewer degrees of separation) may have a higher coefficient than entities that are further apart in the social graph 1600.

In particular embodiments, networking system 1502 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1506 of the user). A first user may be more interested in other users or concepts that are closer to the first user. As an example and not by way of limitation, if a user is one mile from an airport and two miles from a gas station, networking system 1502 may determine that the user has a higher coefficient for the airport than the gas station based on the proximity of the airport to the user.

In particular embodiments, networking system 1502 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1502 may provide information that is relevant to user's interests and current circumstances, increasing the likelihood that they will find such information of interest. In particular embodiments, networking system 1502 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1502 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1502 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1508 (e.g., via an API or other communication channel), or from another suitable system. In response to the request, networking system 1502 may calculate the coefficient (or access the coefficient information if it has previously been calculated and stored). In particular embodiments, networking system 1502 may measure an affinity with respect to a particular process. Different processes (both internal and external to the online social network) may request a coefficient for a particular object or set of objects. Networking system 1502 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/971,1027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1604 corresponding to a particular photo may have a privacy setting specifying that the photo may only be accessed by users tagged in the photo and their friends. In particular embodiments, privacy settings may allow users to opt in or opt out of having their actions logged by networking system 1502 or shared with other systems (e.g., third-party system 1508). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1508, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1502 may send a request to the data store for the object. The request may identify the user associated with the request and may only be sent to the user (or a client device 1506 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying a virtual user identity within a three-dimensional (3D) virtual reality environment displayed by a head mounted display associated with a user, wherein the virtual user identity is associated with a co-user of a communications system;
determining a social relationship type for the co-user based on social graph information associated with the user and the co-user;
automatically selecting, without user interaction, a 3D graphical representation type specific to the social relationship type for the co-user;
automatically selecting, without user interaction, a set of virtual reality communication capabilities specific to the social relationship type for the co-user to enable the co-user to interact with the user within the 3D virtual reality environment by utilizing associations between the social relationship type and one or more virtual reality communication capabilities to select a combination of two or more of a symbol-based virtual reality communication capability, a color-based virtual reality communication capability, a movement-based virtual reality communication capability, an emote-based virtual reality communication capability, or a voice-based virtual reality communication capability; and
in response to detecting the co-user within a point of view of the user in the 3D virtual reality environment, causing the head mounted display to automatically display the co-user within the 3D virtual reality environment utilizing the automatically selected 3D graphical representation type to represent the virtual user identity associated with the co-user within the 3D virtual reality environment and to generate communications transmitted by a device corresponding to the co-user using the automatically selected set of virtual reality communication capabilities from for the co-user within the 3D virtual reality environment.

2. The computer-implemented method of claim 1, further comprising determining the social relationship type for the co-user by determining a number of social connections between the user and the co-user from the social graph information, wherein the social relationship type comprises at least one of a family member type, a close friend type, a casual friend type, an acquaintance type, a stranger type, or a restricted type.

3. The computer-implemented method of claim 1, wherein the 3D graphical representation type for the co-user comprises at least one of:
a first 3D graphical representation type having a first level of graphical detail; or
a second 3D graphical representation type having a second level of graphical detail different than the first level of graphical detail.

4. The computer-implemented method of claim 1, further comprising:
identifying a second virtual user identity within the 3D virtual reality environment, wherein the second virtual user identity is associated with a second co-user of the communications system;
determining a social relationship type for the second co-user based on social graph information associated with the user and the second co-user, wherein the social relationship type for the co-user is different than the social relationship type for the second co-user; and
causing the head mounted display to display a second 3D graphical representation type specific to the social relationship type for the second co-user to represent the second virtual user identity within the 3D virtual reality environment.

5. The computer-implemented method of claim 1, further comprising determining the social relationship type for the co-user by utilizing connections between the user and the co-user from nodes and edges of the social graph information.

6. The computer-implemented method of claim 1, further comprising:
identifying multiple virtual user identities within the 3D virtual reality environment, wherein the multiple virtual user identities are associated with multiple co-users of the communications system;
determining a social relationship type for the multiple co-users based on social graph information associated with the user and the multiple co-users, wherein the social relationship type for the co-user is different than the social relationship type for the multiple co-users;
selecting an additional set of virtual reality communication capabilities specific to the social relationship type for the multiple co-users, wherein the additional set of virtual reality communication capabilities is different from the set of virtual reality communication capabilities; and
causing the head mounted display to generate additional communications corresponding to the additional set of virtual reality communication capabilities from the multiple co-users within the 3D virtual reality environment as an aggregate communication.

7. The computer-implemented method of claim 1, further comprising:
providing, for display within a graphical user interface of the head mounted display associated with the user, graphical representation preference information with a selectable option to associate one or more 3D graphical representation types with one or more social relationship types; and
receiving, from the head mounted display, a user selection of a particular 3D graphical representation type for a particular social relationship type.

8. A non-transitory computer-readable medium storing instructions that, when executed by at least one processor, cause a computer device to:
identify a virtual user identity within a three-dimensional (3D) virtual reality environment displayed by a head mounted display associated with a user, wherein the virtual user identity is associated with a co-user of a communications system;
determine a social relationship type for the co-user based on social graph information associated with the user and the co-user;
automatically select, without user interaction, a 3D graphical representation type specific to the social relationship type for the co-user;
automatically select, without user interaction, a set of virtual reality communication capabilities specific to the social relationship type for the co-user to enable the co-user to interact with the user within the 3D virtual reality environment by utilizing associations between the social relationship type and one or more virtual reality communication capabilities to select a combination of two or more of a symbol-based communication capability virtual reality, a color-based virtual reality communication capability, a movement-based virtual reality communication capability, an emote-based virtual reality communication capability, or a voice-based virtual reality communication capability; and
in response to detecting the co-user within a point of view of the user in the 3D virtual reality environment, cause the head mounted display to automatically display the co-user within the 3D virtual reality environment utilizing the automatically selected 3D graphical representation type to represent the virtual user identity associated with the co-user within the 3D virtual reality environment and to generate communications transmitted by a device corresponding to the co-user using the automatically selected set of virtual reality communication capabilities for the co-user within the 3D virtual reality environment.

9. The non-transitory computer-readable medium of claim 8, further storing instructions that, when executed by the at least one processor, cause the computer device to determine the social relationship type for the co-user by determining a number of social connections between the user and the co-user from the social graph information, wherein the social relationship type comprises at least one of a family member type, a close friend type, a casual friend type, an acquaintance type, a stranger type, or a restricted type.

10. The non-transitory computer-readable medium of claim 8, wherein the 3D graphical representation type for the co-user comprises at least one of:
a first 3D graphical representation type having a first level of graphical detail; or
a second 3D graphical representation type having a second level of graphical detail different than the first level of graphical detail.

11. The non-transitory computer-readable medium of claim 8, further storing instructions that, when executed by the at least one processor, cause the computer device to:
identify a second virtual user identity within the 3D virtual reality environment, wherein the second virtual user identity is associated with a second co-user of the communications system;
determine a social relationship type for the second co-user based on social graph information associated with the user and the second co-user, wherein the social relationship type for the co-user is different than the social relationship type for the second co-user; and
cause the head mounted display to display a second 3D graphical representation type specific to the social relationship type for the second co-user to represent the second virtual user identity within the 3D virtual reality environment.

12. The non-transitory computer-readable medium of claim 11, wherein:
causing the head mounted display to display the co-user within the 3D virtual reality environment utilizing the selected 3D graphical representation type by causing the head mounted display to display a digital avatar to represent the virtual user identity associated with the co-user within the 3D virtual reality environment; and causing the head mounted display to display the second 3D graphical representation type specific to the social relationship type for the second co-user comprises causing the head mounted display to display a digital dot to represent the second virtual user identity associated with the second co-user within the 3D virtual reality environment.

13. The non-transitory computer-readable medium of claim 8, further storing instructions that, when executed by the at least one processor, cause the computer device to:

select a display position for the co-user specific to the social relationship type for the co-user; and cause the head mounted display to display the 3D graphical representation type of the co-user within the 3D virtual reality environment at the display position.

14. The non-transitory computer-readable medium of claim 13, further storing instructions that, when executed by the at least one processor, cause the computer device to select the display position by selecting a radial range specific to the social relationship type for the co-user, the radial range indicating a radial distance from the user within the 3D virtual reality environment.

15. A system comprising:

at least one processor; and at least one non-transitory computer-readable storage medium storing instructions that, when executed by the at least one processor, cause the system to:

identify a virtual user identity within a three-dimensional (3D) virtual reality environment displayed by a head mounted display associated with a user, wherein the virtual user identity is associated with a co-user of a communications system;

determine a social relationship type for the co-user based on social graph information associated with the user and the co-user;

automatically select, without user interaction, a 3D graphical representation type specific to the social relationship type for the co-user;

automatically select, without user interaction, a set of virtual reality communication capabilities specific to the social relationship type for the co-user to enable the co-user to interact with the user within the 3D virtual reality environment by utilizing associations between the social relationship type and one or more virtual reality communication capabilities to select a combination of two or more of a symbol-based virtual reality communication capability, a color-based virtual reality communication capability, a movement-based virtual reality communication capability, an emote-based virtual reality communication capability, or a voice-based virtual reality communication capability; and in response to detecting the co-user within a point of view of the user in the 3D virtual reality environment, cause the head mounted display to automatically display the co-user within the 3D virtual reality environment utilizing the automatically selected 3D graphical representation type to represent the virtual user identity associated with the co-user within the 3D virtual reality environment and to generate communications transmitted by a device corresponding to the co-user using the automatically selected set of virtual reality communication capabilities for the co-user within the 3D virtual reality environment.

16. The system of claim 15, further comprising instructions that, when executed by the at least one processor, cause the system to determine the social relationship type for the co-user by determining a number of social connections between the user and the co-user from the social graph information, wherein the social relationship type comprises at least one of a family member type, a close friend type, a casual friend type, an acquaintance type, a stranger type, or a restricted type.

17. The system of claim 15, wherein the 3D graphical representation type for the co-user comprises at least one of:

a first 3D graphical representation type having a first level of graphical detail; or a second 3D graphical representation type having a second level of graphical detail different than the first level of graphical detail.

18. The system of claim 15, further comprising instructions that, when executed by the at least one processor, cause the system to:

identify a second virtual user identity within the 3D virtual reality environment, wherein the second virtual user identity is associated with a second co-user of the communications system;

determine a social relationship type for the second co-user based on social graph information associated with the user and the second co-user, wherein the social relationship type for the co-user is different than the social relationship type for the second co-user; and select an additional set of virtual reality communication capabilities specific to the social relationship type for the second co-user, wherein the additional set of virtual reality communication capabilities is different from the set of virtual reality communication capabilities.

19. The system of claim 18, wherein:

causing the head mounted display to display the co-user within the 3D virtual reality environment utilizing the selected 3D graphical representation type by causing the head mounted display to display a digital avatar to represent the virtual user identity associated with the co-user within the 3D virtual reality environment; and causing the head mounted display to display a 3D second graphical representation type specific to the social relationship type for the second co-user comprises causing the head mounted display to display a digital dot to represent the second virtual user identity associated with the second co-user within the 3D virtual reality environment.

20. The system of claim 19, wherein:

the set of virtual reality communication capabilities for the co-user comprise the movement-based virtual reality communication capability and the voice-based virtual reality communication capability; and the additional set of virtual reality communication capabilities for the second co-user comprise the color-based virtual reality communication capability and the movement-based virtual reality communication capability.

\* \* \* \* \*